United States Patent
Simone et al.

(10) Patent No.: US 11,371,114 B2
(45) Date of Patent: *Jun. 28, 2022

(54) METHOD OF RELIEVING STRESS FROM FACE PLATE WELDS OF A GOLF CLUB HEAD

(71) Applicant: KARSTEN MANUFACTURING CORPORATION, Phoenix, AZ (US)

(72) Inventors: Matthew W. Simone, Phoenix, AZ (US); Travis D. Milleman, Cave Creek, AZ (US); Martin R. Jertson, Cave Creek, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,543

(22) Filed: Feb. 19, 2021

(65) Prior Publication Data

US 2021/0172037 A1   Jun. 10, 2021

Related U.S. Application Data

(63) Continuation of application No. 16/799,557, filed on Feb. 24, 2020, now Pat. No. 10,954,581, which is a (Continued)

(51) Int. Cl.
*A63B 53/00* (2015.01)
*C21D 9/50* (2006.01)
(Continued)

(52) U.S. Cl.
CPC ............... *C21D 9/50* (2013.01); *A63B 53/02* (2013.01); *A63B 53/047* (2013.01);
(Continued)

(58) Field of Classification Search
CPC .............. A63B 53/042; A63B 53/0416; A63B 53/0466; A63B 53/047; A63B 53/04
(Continued)

(56) References Cited

U.S. PATENT DOCUMENTS

| | | | |
|---|---|---|---|
| 5,378,295 A | 1/1995 | Yamashita | |
| 5,505,795 A | 4/1996 | Tsai | |

(Continued)

FOREIGN PATENT DOCUMENTS

| | | |
|---|---|---|
| JP | 06-304272 A | 11/1994 |
| JP | 07-59880 A | 3/1995 |
| JP | 07-59882 A | 3/1995 |

OTHER PUBLICATIONS

Stress Relief of Weld by Heat Treatment and Vibration: A Comparison Between the Two Methods, Source: http://www.stressreliefengr.com/stressreliefvsr.html.

*Primary Examiner* — Eugene L Kim
*Assistant Examiner* — Matthew B Stanczak

(57) ABSTRACT

The present disclosure relates to methods for forming a golf club head assembly comprising a golf club head body and a high strength faceplate. The high strength faceplate can be heat treated. After welding the faceplate to the club head body, vibrational waves can be used to relive stress in the weld heat affected zones of the golf club body and faceplate.

20 Claims, 12 Drawing Sheets

Related U.S. Application Data continuation of application No. 15/924,044, filed on Mar. 16, 2018, now Pat. No. 10,612,109, which is a continuation-in-part of application No. 15/354,685, filed on Nov. 17, 2016, now Pat. No. 10,260,138.

(60) Provisional application No. 62/473,122, filed on Mar. 17, 2017, provisional application No. 62/257,331, filed on Nov. 19, 2015.

(51) Int. Cl.
| | | |
|---|---|---|
| *A63B 53/02* | (2015.01) | |
| *C21D 10/00* | (2006.01) | |
| *A63B 53/04* | (2015.01) | |
| *B23K 31/02* | (2006.01) | |
| *B23K 10/02* | (2006.01) | |
| *A63B 60/52* | (2015.01) | |

(52) U.S. Cl.
CPC .......... *A63B 53/0466* (2013.01); *C21D 10/00* (2013.01); *A63B 53/04* (2013.01); *A63B 53/042* (2020.08); *A63B 53/0416* (2020.08); *A63B 53/0425* (2020.08); *A63B 53/0458* (2020.08); *A63B 53/0487* (2013.01); *A63B 60/52* (2015.10); *A63B 2053/0479* (2013.01); *A63B 2053/0483* (2013.01); *A63B 2209/00* (2013.01); *B23K 10/02* (2013.01); *B23K 31/02* (2013.01)

(58) Field of Classification Search
USPC ........ 473/329, 342, 343, 345, 349, 350, 409
See application file for complete search history.

(56) References Cited

U.S. PATENT DOCUMENTS

| | | |
|---|---|---|
| 5,769,307 A | 6/1998 | Takeda |
| 5,871,408 A | 2/1999 | Chen |
| 6,776,726 B2 | 8/2004 | Sano |
| 6,841,014 B2 | 1/2005 | Huang |
| 6,902,497 B2 | 6/2005 | Deshmukh |
| 7,175,722 B2 | 2/2007 | Walker |
| 8,777,777 B2 | 7/2014 | Cole |
| 9,238,858 B2 | 1/2016 | Simone et al. |
| 9,452,488 B2 | 9/2016 | Simone et al. |
| 9,492,722 B2 | 11/2016 | Taylor |
| 9,926,615 B2 | 3/2018 | Simone et al. |
| 9,938,601 B2 | 4/2018 | Simone et al. |
| 10,258,837 B2 | 4/2019 | Simone et al. |
| 10,329,632 B2 | 6/2019 | Simone et al. |
| 10,695,619 B2 | 6/2020 | Simone et al. |
| 10,704,130 B2 * | 7/2020 | Simone ................. B23K 10/02 |
| 2003/0029846 A1* | 2/2003 | Takeda ................. A63B 53/047 |
| | | 219/121.64 |
| 2003/0036442 A1* | 2/2003 | Chao ..................... A63B 60/00 |
| | | 473/345 |
| 2005/0045253 A1 | 3/2005 | De La Cruz |
| 2006/0052179 A1* | 3/2006 | Hou ..................... A63B 53/047 |
| | | 473/342 |
| 2006/0283920 A1 | 12/2006 | Chitty |
| 2010/0154196 A1* | 6/2010 | Hirano ............... A63B 53/0466 |
| | | 29/527.1 |
| 2010/0181368 A1 | 7/2010 | Galloway |
| 2012/0302368 A1* | 11/2012 | Nishio .................. A63B 53/04 |
| | | 473/345 |
| 2015/0087440 A1 | 3/2015 | Ines |
| 2016/0367869 A1 | 12/2016 | Simone et al. |

* cited by examiner

METHOD OF RELIEVING STRESS FROM FACE PLATE WELDS OF A GOLF CLUB HEAD

CROSS-REFERENCE TO RELATED APPLICATION

This is a continuation of U.S. patent application Ser. No. 16/799,557, filed on Feb. 24, 2020, which is a continuation of U.S. patent application Ser. No. 15/924,044, filed on Mar. 16, 2018, now U.S. Pat. No. 10,612,109, issued Apr. 7, 2020 which claims the benefit of U.S. Provisional Patent Application No. 62/473,122, filed Mar. 17, 2017, and is a continuation in part of U.S. patent application Ser. No. 15/354,685, filed Nov. 17, 2016, now U.S. Pat. No. 10,260,138, issued Apr. 16, 2019 which claims the benefit of U.S. Provisional Patent Application No. 62/257,331, filed on Nov. 19, 2015, the contents of which are incorporated fully by reference herein.

FIELD OF INVENTION

The present disclosure relates to methods for forming a golf club head assembly using a combination of different, but separate heat treatments for the golf club head body and high strength faceplate, and vibrational waves to relive stress in the weld heat affected zones of the golf club body and face.

BACKGROUND

The present invention relates to golf clubs and particularly to a method of forming a golf club head assembly. Conventional golf club head assemblies include a faceplate welded to a club head. The faceplate has a slightly rounded shape in order to provide a straighter and/or longer flight path for a golf ball, even when the ball is struck off-center with respect to the faceplate. The faceplate has a bulge dimension, or curvature from a toe end to a heel end, and a roll dimension, or curvature from the crown edge to the sole edge.

When welding a face of high strength material to a golf head body of different material, processes are desired to make the face as strong as possible. Utilization of high strength face materials requires a trade-off between making the face as strong as the material will allow, and having the body maintain its' ductility and overall structural movement. The ductility allows the club head to bend and flex in a way to aid in lie angle bending. The overall structural movement is important for launch angle, spin, and ball speed.

Often the weld line between the face and the golf club head oxidizes and forms crystals between the faceplate and the club head body. This can lead to defects in the assembled golf club head. Accordingly, there is a need in the art to improve methods for manufacturing golf club heads taking advantage of high strength face materials and welding to golf club head bodies composed of different materials than the faceplate. Aspects of the invention will become apparent by consideration of the detailed description and accompanying drawings.

Figure 1:
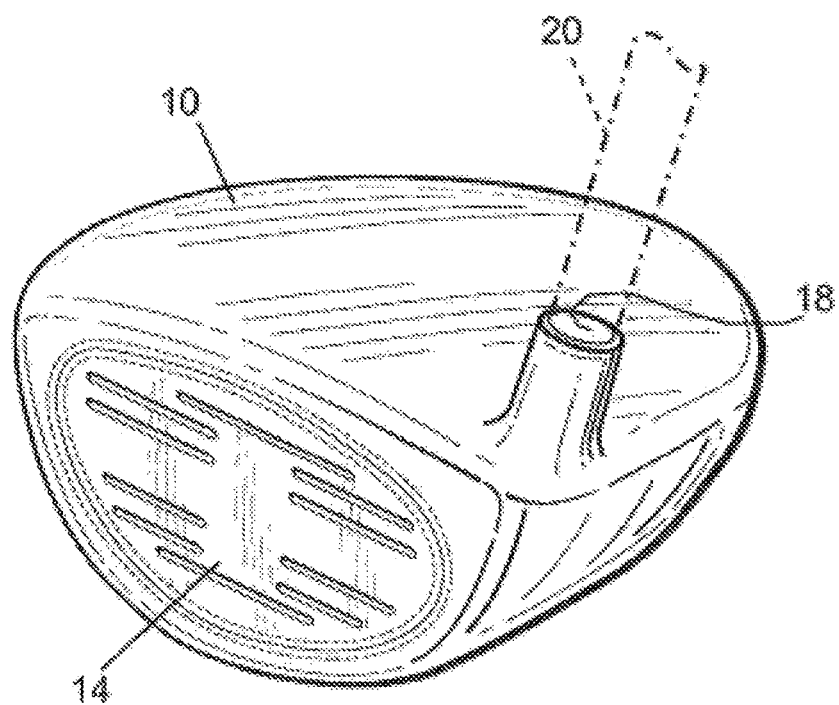
FIG. 1 is a perspective view of a club head and a face plate.

Other aspects of the disclosure will become apparent by consideration of the detailed description and accompanying drawings.

For simplicity and clarity of illustration, the drawing figures illustrate the general manner of construction, and descriptions and details of well-known features and techniques can be omitted to avoid unnecessarily obscuring the present disclosure. Additionally, elements in the drawing figures are not necessarily drawn to scale. For example, the dimensions of some of the elements in the figures can be exaggerated relative to other elements to help improve understanding of embodiments of the present disclosure. The same reference numerals in different figures denote the same elements.

DETAILED DESCRIPTION

Heat curing of an assembled golf club head has two goals. One, to cure the faceplate materials to maximize strength and minimize brittleness. Second, relieve any stresses introduced by the weld line between the faceplate and the golf club head. Often, the weld line between the face and the golf club head oxidizes and forms crystals between the faceplate and the club head body (thereby introducing defects to the assembled golf club head) unless a heat curing step is performed after welding. Utilization of this heat curing step on the high strength faceplate materials requires a trade-off between the mechanical properties desired for the faceplate and the golf club body. A different level of heat curing (temperate and time) a faceplate is required over a heat curing treatment of a golf club head body because the material of the faceplate and the golf club head body are different. The goal of heat curing a faceplate is to make the faceplate material as strong as the material will allow, and yet avoid introducing an unacceptable level of brittleness. The goal of heat curing a golf club body is also to relieve stresses introduced during forging, but also maintain its' ductility and overall structural movement and strength. Heat curing an assembled golf club head (faceplate and club body together) therefore does not achieve complete utilization of desired mechanical properties for different materials comprising the faceplate and golf club head body.

Described herein is a process for forming a golf club head utilizing a high strength face material (a first material) such as Ti-9s with a heat curing treatment, but sparing the club head body from the same heat curing step. The club head body is made of a different or second material such as stainless steel, titanium, steel or aluminum material or alloy such as Ti 6-4 or 431 steel. The heat curing treatments of the body and the face are different to utilize ideal properties of the faceplate and golf club body materials. After these different heat curing treatments of the club head body and club head face, the face is welded to the club head body through methods known in the art. The process is completed by using vibrational waves to relieve the stress around a heat affected zone (HAZ) formed around the welded joint as opposed to a thermal heat treatment. This process prevents a unilateral heat treatment affecting the mechanical properties of not only the weld, but also the faceplate and golf club body. In this process, the variable heat curing treatments of the faceplate and golf club body, and subsequent use of vibrational waves to relieve the weld lines in the HAZ between the faceplate and golf club body allow the manufacturer to utilize ideal strength, ductility, and durability mechanical parameters of the materials comprising the club head face and body.

In many embodiments, the golf club head can be a wood or hybrid type golf club head, wherein a wood or hybrid type club head can be a driver, a fairway wood, a hybrid or a cross-over type club head. A wood or hybrid type golf club head can have a volume within the range of 200 cc to 500 cc. For example, the volume of the golf club head can be 200 cc, 250 cc, 300 cc, 350 cc, 400 cc, 440 cc, 445 cc, 450 cc, 455 cc, 460 cc, 465 cc, 470 cc, 475 cc, 480 cc, 485 cc, 490 cc, 495 cc, or 500 cc. Further, the loft on a wood or hybrid type golf club head can be within the range of 5 degrees to 40 degrees. For example, the golf club head can have a loft of 5 degrees, 10 degrees, 15 degrees, 20 degrees, 25 degrees, 30 degrees, 35 degrees, or 40 degrees.

In other embodiments, the golf club head can be an iron type golf club head. An iron type golf club head can have a volume within the range of 10 cc to 100 cc. For example, the volume of the golf club head can be 10 cc, 20 cc, 30 cc, 40 cc, 50 cc, 60 cc, 70 cc, 80 cc, 90 cc, or 100 cc. Further, the loft of the iron type golf club head can be within the range of 10 degrees to 80 degrees. For example, the golf club head can have a loft of 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, or 80 degrees. The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but can include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

I) Wood or Hybrid Type Club Head with High Strength Face Material

Figure 2:
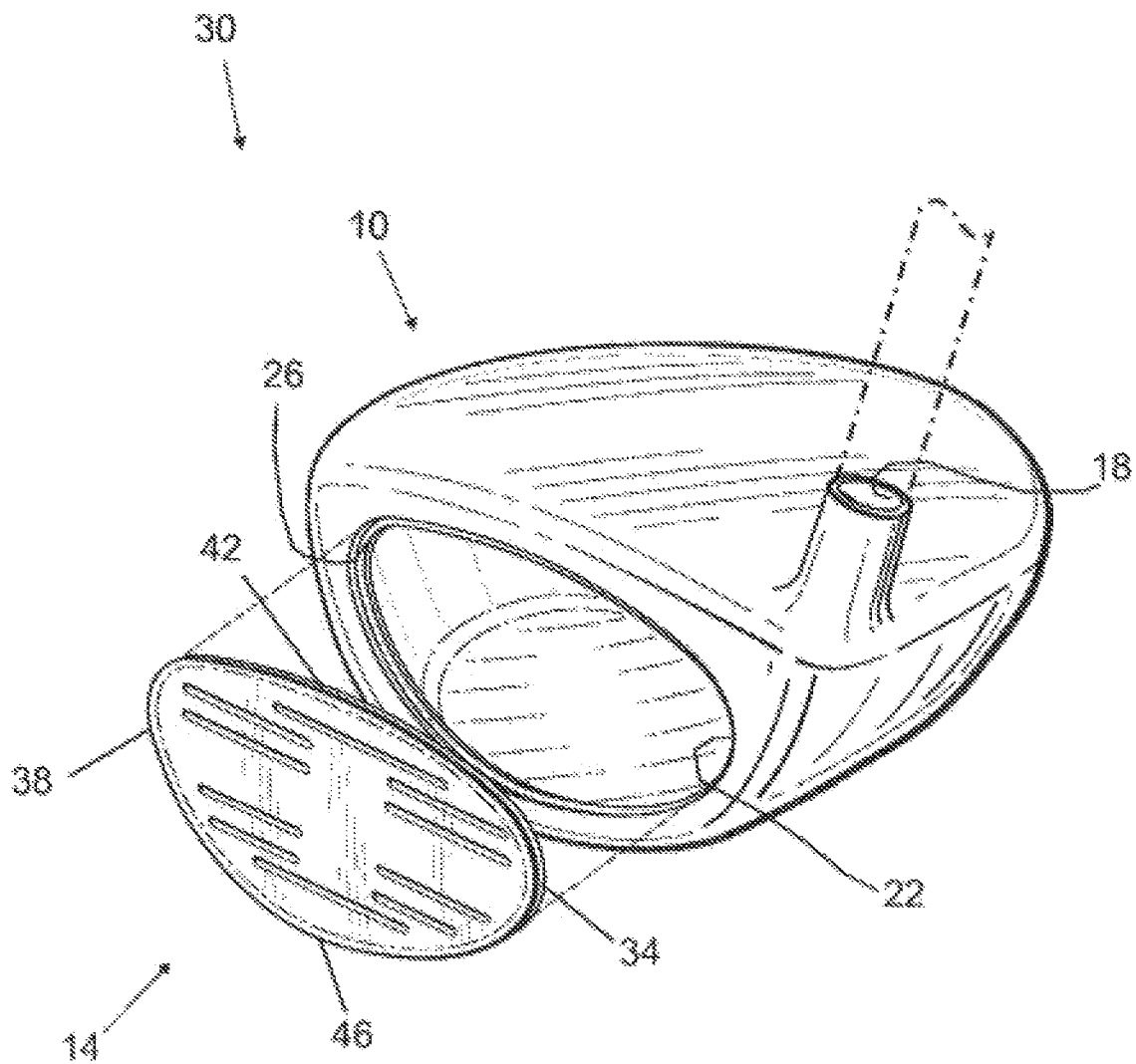
FIG. 2 is a perspective view of the club head with the face plate removed.
Figure 3:
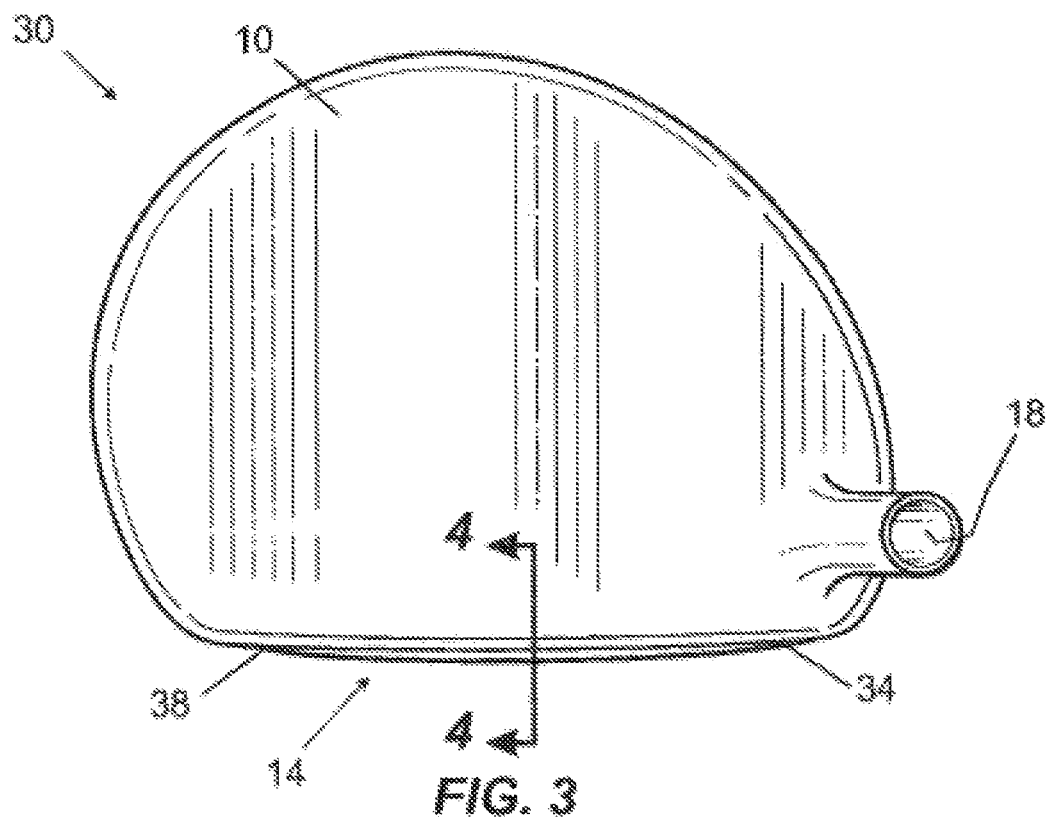
FIG. 3 is a top view of a club head assembly.

FIG. 1-3 shows a golf club head 10 and a faceplate 14. In one embodiment, the golf club head 10 is formed from a first material and the faceplate 14 is formed from a second material. The first material can be a cast material and the second material can be a rolled material. Further, in the illustrated embodiment, the golf club head 10 is for a metal wood driver; in other embodiments, the golf club head 10 is for a fairway wood; in other embodiments, the golf club head 10 is for hybrid clubs; in other embodiments, the golf club head 10 is for an iron club. The club head 10 can also include a hosel and a hosel transition (shown as 18). For example, the hosel can be located at or proximate to the heel end 34. The hosel can extend from the club head 10 via the hosel transition 18. To form a golf club, the hosel can receive a first end of a shaft 20. The shaft 20 can be secured to the golf club head 10 by an adhesive bonding process (e.g., epoxy) and/or other suitable bonding processes (e.g., mechanical bonding, soldering, welding, and/or brazing). Further, a grip (not shown) can be secured to a second end of the shaft 20 to complete the golf club.

As shown in FIG. 2, the club head 10 further includes a recess or opening 22 for receiving the faceplate 14. In the illustrated embodiment, the opening 22 includes a lip 26 extending around the perimeter of the opening 22. The faceplate 14 is aligned with the opening and abuts the lip 26. As discussed below, the faceplate 14 is secured to the club head 10 by welding, forming a club head assembly 30.

Figure 4:
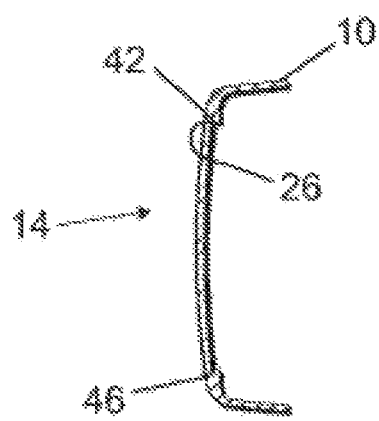
FIG. 4 is a side section view of the club head assembly of FIG. 3 along section 4-4.
Figure 5:
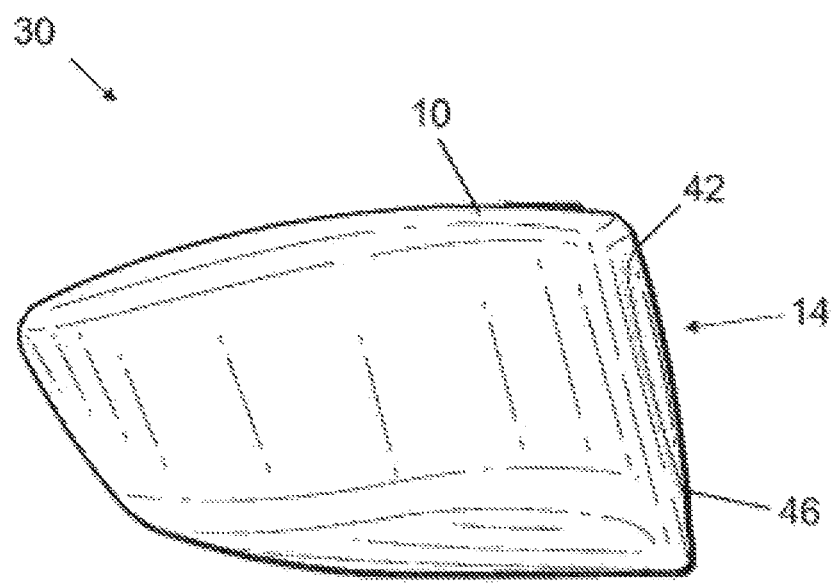
FIG. 5 is a side view of the club head assembly of FIG. 3.

The faceplate 14 includes a heel end 34 and a toe end 38 opposite the heel end 34. The heel end 34 is positioned proximate the hosel portion (hosel and hosel transition 18) where the shaft 20 (FIG. 1) is coupled to the club head assembly 30. The faceplate 14 further includes a crown edge 42 and a sole edge 46 opposite the crown edge 42. The crown edge 42 is positioned adjacent an upper edge of the club head 10, while the sole edge 46 is positioned adjacent the lower edge of the club head 10. As shown in FIG. 3, the faceplate 14 has a bulge curvature in a direction extending between the heel end 34 and the toe end 38. As shown in FIGS. 4 and 5, the faceplate 14 also has a roll curvature in a direction extending between the crown edge 42 and the sole edge 46. In one embodiment, the faceplate can have a minimum wall thickness of 2.0 millimeters, 1.9 millimeters, 1.8 millimeters, 1.7 millimeters, 1.6 millimeters, 1.5 millimeters, 1.4 millimeters, 1.3 millimeters, 1.2 millimeters, 1.1 millimeters, 1.0 millimeters, 0.9 millimeters, 0.8 millimeters, 0.7 millimeters, 0.6 millimeters, 0.5 millimeters and 0.4 millimeters. In one embodiment, the faceplate can have a minimum wall thickness of 0.7 millimeters.

A. Faceplate Material

As discussed above, the faceplate 14 is formed from a first material. The first material can be a high strength face material. The first material can be a steel-based material, a titanium based material, an aluminum alloy, a titanium alloy or any combination thereof. The steel-based material can be a 17-4 PH stainless steel, 455, 475, C300, AerMet 300, a nitronic RTM 50 stainless steel, a maraging steel, or other types of stainless steel. The aluminum alloy can be high strength aluminum alloy, or a composite aluminum alloy coated with a high-strength alloy. The titanium alloy can be Ti-9S, Ti-6-4, and Ti-15-3-3-3. The titanium alloy may be an α-β titanium alloy.

In one embodiment, the α-β Ti can be Ti 6-4 containing 6 wt % aluminum (Al), and 4 wt % vanadium (V), with the remaining alloy composition being titanium and possibly some trace elements. In some embodiments, Ti 6-4 contains between 5.5 wt %-6.75 wt % Al, between 3.5 wt %-4.5 wt % V, a maximum of 0.08 wt % carbon (C), a maximum of 0.03 wt % silicon (Si), a maximum of 0.3 wt % iron (Fe), a maximum of 0.2 wt % oxygen (O), a maximum of 0.015 wt % tin (Sn), and trace amounts of molybdenum (Mo), with the remaining alloy composition being titanium. In some embodiments, Ti 6-4 contains between 5.5 wt %-6.75 wt % Al, between 3.5 wt %-4.5 wt % V, 0.08 wt % or less carbon (C), 0.03 wt % or less silicon (Si), 0.3 wt % or less iron (Fe), 0.2 wt % or less oxygen (O), 0.015 wt % or less tin (Sn), and trace amounts of molybdenum (Mo), with the remaining alloy composition being titanium. Ti 6-4 is a grade 5 titanium. The solvus temperature for Ti 6-4 is between 540° C. and 560° C. In some embodiments, Ti 6-4 has a density of 0.1597 lb/in$^3$ (4.37 g/cc). Ti-6-4 can also be designated as T-65K.

The titanium alloy can be an α-β titanium (α-β Ti) alloy. The α-β Ti alloy can contain neutral alloying elements such as tin and a stabilizers such as aluminum and oxygen. The α-β Ti alloy can contain β-stabilizers such as molybdenum, silicon and vanadium. All numbers described below regarding weight percent are a total weight percent (wt %). The total weight percent of α-stabilizer aluminum in α-β Ti alloy can be between 2 wt % to 10 wt %, 3 wt % to 9 wt %, 4 wt % to 8 wt %, or 5 wt % to 7 wt %. The total weight percent of α-stabilizer oxygen in α-β Ti alloy can be between 0.05 wt % to 0.35 wt %, or 0.10 wt % to 0.20 wt %. The total weight percent of β-stabilizer molybdenum in α-β Ti alloy can be between 0.2 wt % to 1.0 wt %, or 0.6 wt % to 0.8 wt %, or trace amounts. The total weight percent of β-stabilizer vanadium in α-β Ti alloy can be between 1.5 wt % to 7 wt %, or 3.5 wt % to 4.5 wt %. The total weight percent of β-stabilizer silicon in α-β Ti alloy can be between 0.01 to 0.10 wt %, or 0.03 wt % to 0.07 wt %. The α-β Ti alloy can be Ti-6Al-4V (or Ti 6-4), Ti-9S (or T-9S), Ti-662, Ti-8-1-1, Ti-65K, Ti-6246, or IMI 550. The combination of α, β stabilizers allows the α-β Ti alloys to be heat treated.

In another embodiments, the α-β Ti alloy can be Ti-9S (or T-9S), which contains 8 wt % Al, 1 wt % V, and 0.2 wt % Si, with the remaining alloy composition being titanium and possibly some trace elements. In some embodiments, Ti-9S (or T-9S) contains 6.5 wt %-8.5 wt % Al, between 1 wt %-2 wt % V, a maximum of 0.08 wt % C, a maximum of 0.2 wt % Si, a maximum of 0.3 wt % Fe, a maximum of 0.2 wt % O, a maximum of 0.05 wt % N, trace amounts of Mo, and trace amounts of Sn, with the remaining alloy composition being titanium. In some embodiments, Ti-9S (or T-9S) contains 6.5 wt %-8.5 wt % Al, between 1 wt %-2 wt % V, less than 0.1 wt % C, a maximum of 0.2 wt % Si, a maximum of 0.4 wt % Fe, a maximum of 0.15 wt % O, less than 0.05 wt % N, trace amounts of Mo, and trace amounts of Sn, with the remaining alloy composition being titanium. In some embodiments, Ti-9S (or T-9S) contains 6.5 wt %-8.5 wt % Al, between 1 wt %-2 wt % V, 0.1 wt % or less C, 0.2 wt % or less Si, 0.4 wt % or less Fe, 0.15 wt % or less O, less than 0.05 wt % N, trace amounts of Mo, and trace amounts of Sn, with the remaining alloy composition being titanium. The solvus temperature for Ti-9S (or T-9S) is between 560° C. and 590° C. In some embodiments, the Ti-9S (or T-9s) will have higher porosity and a lower yield than Ti 8-1-1. Ti-9S (or T-9S) has a density of about 0.156 lb/in$^3$ to 0.157 lb/in$^3$ (4.32-4.35 g/cc). Ti-9S (or T-9S) has a density of 0.156 lb/in$^3$ (4.32 g/cc).

In other embodiments, the α-β Ti alloy can be Ti 6-6-2, Ti-6246, or IMI 550. Titanium 662 can contain 6 wt % Al, 6 wt % V, and 2 wt % Sn, with the remaining alloy composition being titanium and possibly some trace elements. Ti-6-6-2 has a density of 0.164 lb/in3 (4.54 g/cc). The solvus temperature for Ti 662 is between 540° C. and 560° C. Titanium 6246 can contain 6 wt % Al, 2 wt % Sn, 4 wt % zirconium (Zr), and 6 wt % Mo, with the remaining alloy composition being titanium and possibly some trace elements. The solvus temperature for Ti 6246 is between 570° C. and 590° C. Ti-6246 has a density of 0.168 lb/in3 (4.65 g/cc). IMI 550 can contain 6 wt % Al, 2 wt % Sn, 4 wt % Mo, and 0.5 wt % Si, with the remaining alloy composition being titanium and possibly some trace elements. The solvus temperature for IMI 550 is between 490° C. and 510° C. IMI 550 has a density of 0.157 lb/in$^3$ (4.60 g/cc).

In other embodiments, the first material can be another α-β Ti alloy, such as Ti-8-1-1, which can contain 8 wt % Al, 1.0 wt % Mo, and 1 wt % V, with the remaining alloy composition being titanium and possibly some trace elements. In some embodiments, Ti-8-1-1 can contain 7.5 wt %-8.5 wt % Al, 0.75 wt %-1.25 wt % Mo., 0.75 wt %-1.25 wt % V, a maximum of 0.08 wt % C, a maximum of 0.3 wt % Fe, a maximum of 0.12 wt % O, a maximum of 0.05 wt % N, a maximum of 0.015 wt % H, a maximum of 0.015 wt % Sn, and trace amounts of Si, with the remaining alloy composition being titanium. The solvus temperature for Ti-8-1-1 is between 560° C. and 590° C. In some embodiments, Ti-8-1-1 has a density of 0.1580 lb/in$^3$ (4.37 g/cc).

B. Wood or Hybrid Type Golf Club Head Material

As discussed above, the golf club head body 14 is formed from a second material. The second can be the same or different from the first material of the faceplate 14. The second material can have less strength than the second material, but provides ductility to bend and flex to aid in lie angle bending. Further, the second material of the golf club head 14 may provide for overall structural movement for launch angle, spin and ball speed via deflection and design capabilities for optimal center of gravity placement.

The second material can be a stainless steel, titanium, aluminum, a steel alloy, a titanium alloy, an aluminum alloy, a combination thereof, or a composite material comprising, for example, plastic polymers and co-polymers, carbon fibers, fiberglass fibers or metal fibers. The steel alloy can be, for example, 455 steel, 475 steel, 431 steel, 17-4 stainless steel, or maraging steel. The titanium alloy can be Ti-7-4, Ti-8-1-1, or Ti-6-4. The aluminum alloy can be high strength aluminum alloy or a composite aluminum alloy coated with a high-strength alloy.

Figure 6:
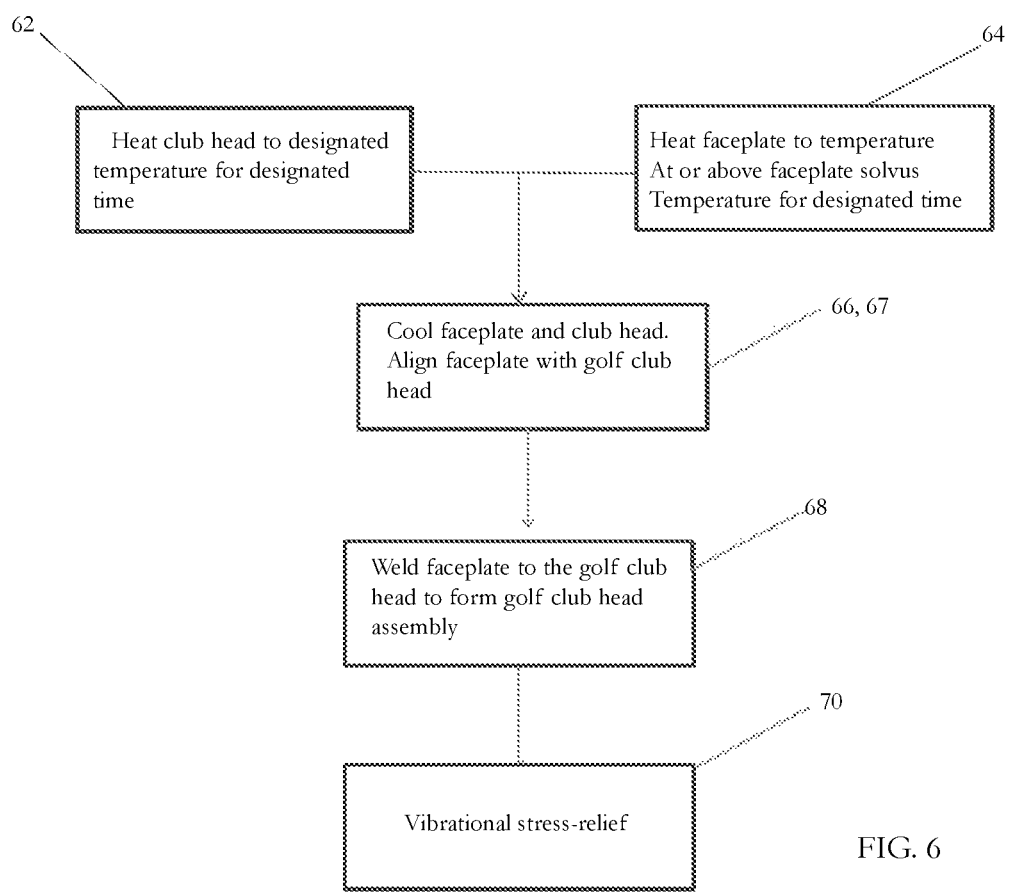
FIG. 6 is a schematic view of a process for forming a golf club assembly.

II) Method of Forming Wood or Hybrid Type Club Head with High Strength Face Material FIG. 6 shows the process for forming for the golf club head assembly 30. The process for forming the club head assembly 30 can comprise heat curing treatments of the faceplate 14 and the golf club head 10 separately before welding into the club head assembly 30, a welding step of the faceplate 14 and the golf club head 10 after heating to form a golf club head assembly 30, and a vibrational curing treatment step of the welded golf club head assembly. In the first step 62, the golf club head 10 is heated using a first heat treatment for a predetermined amount of time. In the second step 64, the faceplate 14 is heated using a second heat treatment for a predetermined amount of time. The second heat treatment of the faceplate 14 can comprise heating the faceplate to a temperature at or above the solvus temperature of the faceplate 14 first material. The first heat treatment of the golf club head 10 is heated to a predetermined temperature over a predetermined amount of time. The third step 66 of the process is allowing the club head and faceplate to air cool. The third step 66 can occur in an inert gas environment. The fourth step of the process 67 is aligning 66 the faceplate 14 treated under the first heat treatment with the club head body 10 treated under the second heat treatment. The fifth step 68 of the process is welding the faceplate 14 to the golf club head 10 to form the golf club head assembly 30. The final step 70 is relieving the stress of the weld of golf club head assembly 30 by vibrational waves. This process allows the face and body to be treated separately allowing the design of the club to utilize the idea physical properties of both the faceplate 14 and the club head body 10 (e.g., ductility, strength, and durability parameters of the materials). The process of FIG. 6 is discussed in more detail below.

A. Heat Treatment of Faceplate and Wood or Hybrid Type Club Head

In one embodiment, the method of forming a golf club head assembly comprises heating both the faceplate 14 and the golf club head 14 to relieve stresses through a thermal heat treatment (62, 64) (see FIG. 6). The heat treatments of the faceplate 14 and the golf club head 14 can be different from each other and separate. The heat treatment of the faceplate 14 can be a first heat treatment tailored to relieve stress in a furnace through thermal heat of microstructure stress. The first heat treatment and the second heat treatment can be performed in any order to each other including simultaneously, but separately. The heat treatment of the faceplate 14 can be used to utilize the high strength of the material of the faceplate 14 (i.e., the first material). The heat treatment of the golf club head 14 can be used to maintain the ductility of the club head body to bend and flex in a way to aid in lie angle bending, and overall structural movement for launch, spin and ball speed. The heat treatment of the golf club head 14 is the second heat treatment and can differ over the first heat treatment of the faceplate 14.

1) First Heat Treatment of the Wood or Hybrid Type Golf Club Head Body

In one embodiment, the golf club head body 10 can be heated under a first heat treatment. In one embodiment of the first heat treatment, the club head body 10 can be exposed to no heat. In one embodiment of the first heat treatment, the club head body 10 can be heated to a temperature at, just above, or greater than the solvus temperature of the club head body 10 for a predetermined amount of time. In another embodiment of the first heat treatment, the club head body 10 can be heated to a temperature below the solvus temperature of the club head body 10 for a predetermined amount of time. Also, during this step, an inert gas can be pumped into the heating chamber housing the club head body 10 to remove all oxygen over a predetermined amount of time discussed below. After heating, inert gas can be pumped back into a chamber under vacuum housing the golf club head body 10, which ensures no oxygen is present to prevent oxidation to the surface of the golf club head body 10.

In one embodiment, the club head body 10 is heat treated between 400° C. and 630° C. in the first step 62. In one embodiment, the club head body 10 is heat treated between 425° C. and 550° C. In one embodiment, the club head body 10 is heat treated between 450° C. and 525° C. in the first step 62. In one embodiment, the club head body 10 is heat treated between 550° C. and 625° C. in the first step 62. In one embodiment, the club head body 10 is heat treated at 400° C., 410° C., 420° C., 430° C., 440° C., 450° C., 460° C., 470° C., 480° C., 490° C., 500° C., 510° C., 520° C., 530° C., 540° C., 550° C., 560° C., 570° C., 580° C., 590° C., 600° C., 610° C., 620° C., or 630° C. in the second step 64 for 30 minutes, 60 minutes, 90 minutes, 120 minutes, 150 minutes, 180 minutes, 210 minutes, 240 minutes, 270 minutes, 300 minutes, 330 minutes or 360 minutes.

In one embodiment, the club head body 10 is heat treated at a temperature of at least 400° C. in the first step 62. In one embodiment, the club head body 10 is heat treated at a temperature of at least 420° C. in the first step 62. In one embodiment, the club head body 10 is heat treated at a temperature of at least 440° C. in the first step 62. In one embodiment, the club head body 10 is heat treated at a temperature of at least 460° C. in the first step 62. In one embodiment, the club head body 10 is heat treated at a temperature of at least 475° C. in the first step 62. In one embodiment, the club head body 10 is heat treated at a temperature of at least 480° C. in the first step 62. In one embodiment, the club head body 10 is heat treated at a temperature of at least 500° C. in the first step 62. In one embodiment, the club head body 10 is heat treated at a temperature of at least 520° C. in the first step 62. In one embodiment, the club head body 10 is heat treated at a temperature of at least 540° C. in the first step 62. In one embodiment, the club head body 10 is heat treated at a temperature of at least 560° C. in the first step 62. In one embodiment, the club head body 10 is heat treated at a temperature of at least 575° C. in the first step 62. In one embodiment, the club head body 10 is heat treated at a temperature of at least 580° C. In one embodiment, the club head body 10 is heat treated at a temperature of at least 600° C. in the first step 62. In one embodiment, the club head body 10 is heat treated at a temperature of at least 620° C. in the first step 62. In one embodiment, the club head body 10 is heat treated at a temperature of at least 625° C. in the first step 62. In one embodiment, the club head body 10 is heat treated at a temperature of at least 630° C. in the first step 62.

In one embodiment, the club head body 10 is heat treated between 475° C. and 500° C. for between 4 hours and 6 hours in the first step 62. In another embodiment, the club head body 10 is heat treated between 575° C. and 625° C. for between 1 hour and 2 hours in the first step 62. In another embodiment, the club head body 10 is heat treated at about 550° C. for between 1 hour and 4 hours. In other embodiments, the club head body 10 can be formed from a different alloy in the first step 62. In other embodiments, the heat treatment process can be implemented at other temperatures for a different amount of time. In addition, the heat treatment can be applied to a variety of materials and a variety of weld-types.

The first heat treatment can improve the strength, ductility and durability of the club head body 10. The improved strength permits the club head body 10 to be made thinner without sacrificing durability, thereby reducing club head weight. The reduced weight of club head body 10 shifts the center of gravity of the club head assembly 30, and allows additional weight to be added to another component of the club to further adjust the center of gravity and moment of inertia. Increasing strength and durability while maintaining the ductility of the club head body 10 allows the body to bend and flex in a way to provide spring back effect to the faceplate 14, aid in lie angle bending, and provide overall structural movement for launch angle, spin and ball speed.

2) Second Heat Treatment of the Faceplate

In one embodiment, the faceplate 14 can be heated under a second heat treatment. In one embodiment of the second heat treatment, the faceplate 14 can be heated to a temperature at, just above, or greater than the solvus temperature of the faceplate for a predetermined amount of time. In another embodiment, the faceplate 14 can be heat treated at a temperature at, just above or greater than the α-β Ti solvus temperature for a predetermined amount of time. Also, during this step, an inert gas can be pumped into the heating chamber housing the faceplate 14 to remove all oxygen over a predetermined amount of time discussed below. After heating to, just above, or greater than the α-β Ti solvus temperature, inert gas can be pumped back into a chamber under vacuum housing the faceplate 14, which ensures no oxygen is present to prevent oxidation to the titanium faceplate 14.

As understood by a person of ordinary skill, the solvus temperature for an alloy is the temperature barrier at which smaller constituent molecules dissolve within the general matrix of the material and become more mobile. The solvus temperature for an α-β Ti depending upon condition of the heating (ie. pressure) can be above 400° C. and below 600° C. Some possible solvus temperature ranges for various titanium alloys are given in Table 1.

TABLE 1

Solvus Temperatures for Titanium Alloys

| α-β Ti | Solvus Temperature (° C.) |
|---|---|
| Ti 6-4 | 540-560 |
| Ti-9S | 560-590 |
| Ti 6246 | 570-590 |
| Ti 662 | 540-560 |
| IMI 550 | 490-510 |
| Ti 8-1-1 | 560-590 |

In one embodiment, the faceplate 14 is heat treated between 400° C. and 630° C. in the second step 64. In one embodiment, the faceplate 14 is heat treated between 425° C. and 550° C. In one embodiment, the faceplate 14 is heat treated between 450° C. and 525° C. in the second step 64. In one embodiment, the faceplate 14 is heat treated between 550° C. and 625° C. in the second step 64. In one embodiment, the faceplate 14 is heat treated at 400° C., 410° C., 420° C., 430° C., 440° C., 450° C., 460° C., 470° C., 480° C., 490° C., 500° C., 510° C., 520° C., 530° C., 540° C., 550° C., 560° C., 570° C., 580° C., 590° C., 600° C., 610° C., 620° C., or 630° C. in the second step 64 for 30 minutes, 60 minutes, 90 minutes, 120 minutes, 150 minutes, 180 minutes, 210 minutes, 240 minutes, 270 minutes, 300 minutes, 330 minutes or 360 minutes.

In one embodiment, the faceplate 14 is heat treated at a temperature of at least 400° C. in the second step 64. In one embodiment, the faceplate 14 is heat treated at a temperature of at least 420° C. in the second step 64. In one embodiment, the faceplate 14 is heat treated at a temperature of at least 440° C. in the second step 64. In one embodiment, the faceplate 14 is heat treated at a temperature of at least 460° C. in the second step 64. In one embodiment, the faceplate 14 is heat treated at a temperature of at least 475° C. in the second step 64. In one embodiment, the faceplate 14 is heat treated at a temperature of at least 480° C. in the second step 64. In one embodiment, the faceplate 14 is heat treated at a temperature of at least 500° C. in the second step 64. In one embodiment, the faceplate 14 is heat treated at a temperature of at least 520° C. in the second step 64. In one embodiment, the faceplate 14 is heat treated at a temperature of at least 540° C. in the second step 64. In one embodiment, the faceplate 14 is heat treated at a temperature of at least 560° C. in the second step 64. In one embodiment, the faceplate 14 is heat treated at a temperature of at least 575° C. in the second step 64. In one embodiment, the faceplate 14 is heat treated at a temperature of at least 580° C. In one embodiment, the faceplate 14 is heat treated at a temperature of at least 600° C. in the second step 64. In one embodiment, the faceplate 14 is heat treated at a temperature of at least 620° C. in the second step 64. In one embodiment, the faceplate 14 is heat treated at a temperature of at least 625° C. in the second step 64. In one embodiment, the faceplate 14 is heat treated at a temperature of at least 630° C. in the second step 64.

In one embodiment, the faceplate 14 is heat treated between 475° C. and 500° C. for between 4 hours and 6 hours in the second step 64. In another embodiment the faceplate 14 is heat treated between 575° C. and 625° C. for between 1 hour and 2 hours in the second step 64. In another embodiment, the faceplate 14 is heat treated at about 550° C. for between 1 hour and 4 hours. In other embodiments, the faceplate 14 can be formed from a different alloy in the second step 64. In other embodiments, the heat treatment process can be implemented at other temperatures for a different amount of time. In addition, the heat treatment can be applied to a variety of materials and a variety of weld-types.

In one embodiment, the faceplate 14 is heat treated at a temperature at or above the solvus temperature of the α-β Ti alloy for between 1 hour and 6 hours in the second step 64. In one embodiment, the faceplate 14 is heat treated at a temperature at or above the solvus temperature of the α-β Ti alloy for between 1 hour and 2 hours in the second step 64. In one embodiment, the faceplate 14 is heat treated at a temperature at or above the solvus temperature of the α-β Ti alloy for between 1 hour and 4 hours in the second step 64. In one embodiment, the faceplate 14 is heat treated at a temperature at or above the solvus temperature of the α-β Ti alloy for between 4 hours and 6 hours in the second step 64. In one embodiment, the faceplate 14 is heat treated at a temperature at or above the solvus temperature of the α-β Ti alloy for between 1.5 hours and 5.5 hours in the second step 64. In one embodiment, the faceplate 14 is heat treated at a temperature at or above the solvus temperature of the α-β Ti alloy for between 2 hours and 5 hours in the second step 64. In one embodiment, the faceplate 14 is heat treated at a temperature at or above the solvus temperature of the α-β Ti alloy for between 2.5 hours and 4.5 hours in the second step 64. In one embodiment, the faceplate 14 is heat treated at a temperature at or above the solvus temperature of the α-β Ti alloy for between 3 hours and 4 hours in the second step 64.

In one embodiment, the faceplate 14 is heat treated at a temperature at or above the solvus temperature of the α-β Ti alloy for at least 1 hour in the second step 64. In one embodiment, the faceplate 14 is heat treated at a temperature at or above the solvus temperature of the α-β Ti alloy for at least 1.5 hours in the second step 64. In one embodiment, the faceplate 14 is heat treated at a temperature at or above the solvus temperature of the α-β Ti alloy for at least 2 hours in the second step 64. In one embodiment, the faceplate 14 is heat treated at a temperature at or above the solvus temperature of the α-β Ti alloy for at least 2.5 hours in the second step 64. In one embodiment, the faceplate 14 is heat treated at a temperature at or above the solvus temperature of the α-β Ti alloy for at least 3 hours in the second step 64. In one embodiment, the faceplate 14 is heat treated at a temperature at or above the solvus temperature of the α-β Ti alloy for at least 3.5 hours in the second step 64. In one embodiment, the faceplate 14 is heat treated at a temperature at or above the solvus temperature of the α-β Ti alloy for at least 4 hours in the second step 64. In one embodiment, the faceplate 14 is heat treated at a temperature at or above the solvus temperature of the α-β Ti alloy for at least 4.5 hours in the second step 64. In one embodiment, the faceplate 14 is heat treated at a temperature at or above the solvus temperature of the α-β Ti alloy for at least 5 hours in the second step 64. In one embodiment, the faceplate 14 is heat treated at a temperature at or above the solvus temperature of the α-β Ti alloy for at least 5.5 hours in the second step 64. In one embodiment, the faceplate 14 is heat treated at a temperature at or above the solvus temperature of the α-β Ti alloy for at least 6 hours in the second step 64.

Heat-treating the faceplate 14 above the solvus temperature. The heat treatment above the solvus temperature disperses stresses throughout the faceplate 14. The heat-treatment improves the durability of the faceplate 14 by relieving the stresses. In addition, heat-treating the faceplate 14 above the solvus temperature reduces the possibility of generating titanium-aluminum ($Ti_3Al$) crystals.

The grains of the faceplate alloy can be aligned in a crown to sole orientation prior to heat treating. The crown to sole orientation of the alloy grains permits stretching in the same direction. In some embodiments, the grains of the faceplate α-β titanium (α-β Ti) alloy can be aligned in a crown to sole orientation prior to heat treating. The crown to sole orientation of the α-β Ti alloy grains permits stretching in the same direction. In some embodiments, the grains of the faceplate Ti-6Al-4V (or Ti 6-4), Ti-9S (or T-9S), Ti-662, Ti-8-1-1, Ti-65K, Ti-15-3-3-3, Ti-6246, or IMI 550 alloy can be aligned in a crown to sole orientation prior to heat treating. The crown to sole orientation of the Ti-6Al-4V (or Ti 6-4), Ti-9S (or T-9S), Ti-662, Ti 8-1-1, Ti-65K, Ti-15-3-3-3, Ti-6246, or IMI 550 alloy grains permits stretching in the same direction.

The second heat treatment also improves the strength of the faceplate 14. The improved strength permits the faceplate 14 to be made thinner without sacrificing durability, thereby reducing club head weight. The reduced weight of faceplate 14 shifts the center of gravity of the club head assembly 30, and allows additional weight to be added to another component of the club to further adjust the center of gravity and moment of inertia. Increasing the strength of the faceplate 14 also increases the durability of the faceplate 14, which permits the faceplate 14 to endure a significantly higher number of hits against a golf ball and maintain the faceplate's slightly bowed or rounded shape over the life of the club while sustaining hundreds or thousands of golf ball strikes. Therefore, the club is more forgiving when a ball is struck off-center because the rounded shape of the faceplate 14 provides a "gear effect" between the ball and faceplate 14.

B. Cooling the Wood or Hybrid Type Golf Club Body and the Faceplate after Heat Treatment In one embodiment of the process, after the steps of heating the club head 10 and the faceplate 14 separately, the club head 10 and the faceplate 14 are allowed to cool to room temperature (66) (see FIG. 6). In another embodiment, after the heat treatment, the club head assembly 30 can be allowed to air cool to slowly reduce the club head assembly's temperature. The cooling of the club head 10 and the faceplate 14 can be done in an inert gas environment or non-contained environment (open air). In one embodiment, the first and second heat treatment steps can be followed by a cooling step where additional inert gas can be pumped back into the chamber where the club head 10 or faceplate 14 are allowed to cool to room temperature. In another embodiment, the club head assembly 30 can be allowed to cool in inert gas to slowly reduce the club head assembly's temperature and reduce chance for oxidation. The inert gas can be selected from the group consisting of nitrogen (N), argon (Ar), helium (He), neon (Ne), krypton (Kr), and xenon (Xe) or a compound gas thereof.

C. Welding Faceplate to the Wood or Hybrid Type Golf Club Head Body

In one embodiment of the process, the cooled club head 10 and the faceplate 14 are aligned (67) and welded (68) to form the golf club head assembly 30 (see FIG. 6). As shown in FIG. 2, the club head 10 can include a recess or opening 22 for receiving the faceplate 14. The opening may include a lip 26 extending around the perimeter of the opening 22. During the welding process, the faceplate 14 is aligned (67) with the opening and the lip 26. The faceplate 14 is secured to the club head 10 by welding (68) to form a club head assembly 30. In one embodiment, the welding can be arc welding, oxyfuel gas welding, resistance welding, solid state welding, laser beam welding, laser hybrid welding, thermite welding, percussion welding, pulse plasma welding, electron beam welding, electrogas welding, stud arc welding, or induction welding. The welding can be a pulse plasma welding process.

The welding between the faceplate 14 and the golf club head 10 can introduce stresses associated with the weld-metal heat affected zone (HAZ) formed by the weld line. The HAZ is an area around the weld in which the material properties have been altered due to the welding process. Because of the stark contrast in mechanical properties between the HAZ and the rest of the metal matrix, the HAZ is much more likely to experience a crack and fail.

As discussed in corresponding US Patent Publication Appl. No. 2015-0232976, which is incorporated fully herein by reference, a heat curing step could be performed on the golf club head assembly 30 after the welding step. As further discussed in US Patent Publication Appl. No. 2015-0232976, previous post-weld treatments were performed below the solvus temperature for a short duration of time. These processes simply aged the metals, but did not address the increased stresses transferred to the weld area. Furthermore, the faceplate was not sufficiently strong and would flatten or lose its curvature relatively quickly. In contrast, the heat treatment above the solvus temperature disperses stresses in the weld metal HAZ. The heat-treatment improves the durability of the HAZ by relieving the stresses. In addition, heat-treating the club head assembly 30 above the solvus temperature reduces the possibility of generating titanium-aluminum ($Ti_3Al$) crystals along the weld. The problem with heating the golf club assembly 30, however, is subsequent heat treat steps on the HAZ require compromised thermal cycles to balance out the mechanical properties of both the golf club body 10 and the faceplate 14.

Specifically, utilization of this heat curing step of the golf club assembly 30 requires a trade-off between the materials of the faceplate and the materials of the golf club body. The goal of heat curing a faceplate is to make the faceplate material as strong as the material will allow, and yet avoid introducing an unacceptable level of brittleness. The goal of heat curing a golf club body is also to relieve stresses introduce during forging, but also maintain its' ductility and overall structural movement. To achieve these goals, a different level of heat curing (temperate and time) a faceplate is required over a heat curing treatment of a golf club head body because the material of the faceplate and the golf club head body are different.

The preassembled heating steps described above in the process allow the design of the club to utilize idea mechanical properties described above for the faceplate 14 and the club head body 10. To relieve the stresses introduced by the welding metal HAZ, use of vibrational waves or sub-harmonic waves can be used to target the HAZ of the golf club assembly 30 in this process.

D. Vibrational Stress Relief

The method of forming a golf club assembly 30 further comprises the step of relieving the stress generated during the welding step using vibrational waves (70) (FIG. 6). The use of vibrational waves is a stress-relief technique disperses stresses in the weld metal HAZ. The use of vibrational waves can also be used to relieve stresses introduced in the faceplate 14 and the club head body 10 during casting. The use of vibrational waves as a stress relieving method of metals is described in U.S. Pat. No. 4,968,359 and use of various vibrational treatments is described in US Patent Publication Appl. No. 2012-0198376, both of which are fully incorporated herein by reference. The method step comprises exposing the golf club assembly 30 to these vibrational stress relief techniques described below.

The vibrational stress-relief technique applies mechanical cyclic vibration energy to the golf club assembly 30 over a test frequency range and then monitoring damping effects of energy flowing into the golf club assembly 30 as a function of frequency to identify a plurality of orders of harmonic vibration absorption peaks, each consisting of a plurality of vibration absorption resonant peaks. This identification of harmonic vibrational absorption peaks can apply to various stress zones in the golf club assembly 30 (i.e, the faceplate 14 and club head body 10) including the HAZ of the golf club assembly 30 after the weld step. A typical metal part can display up to forty-eight resonant peaks grouped into eight orders of harmonics, each consisting of approximately six resonant peaks. Harmonic vibration absorption peaks are distinguished from resonant vibration absorption peaks by appropriately damping the response characteristics of a vibration transducer coupled to the golf club assembly 30 such that the electrical output thereof varies as a function of harmonic groups of resonant peaks rather than the resonant peaks themselves.

The vibrational stress-relieve technique further can comprise identifying a specific harmonic peak among the three lowest orders of harmonics as a function of composition of the golf club assembly 30 to be stress relieved. This can include stress zones within the faceplate 14 and club head body 10 of the golf club assembly 30 that were not properly cured during the heating step of the method, or the HAZ zone of the golf club assembly 30 after the weld step.

For example, the first order of harmonics, centered at approximately twenty-five hertz, is particularly advantageous for stress relief of low-carbon steels and cast iron. The second order of harmonics centered at about forty hertz has been found to be particularly advantageous for high-carbon steels, whereas the third order of harmonics centered at about fifty hertz has been found to particularly advantageous in conjunction with aluminum, titanium or copper alloys. Depending upon the make-up of the faceplate 14 and the golf club body 10, the particular harmonics at a particular hertz (Hz) can be identified to relieve the stress of that part of the golf club assembly 30. The harmonics can therefore be centered at about 24 Hz, 25 Hz, 26 Hz, 27 Hz, 28 Hz, 29 Hz, 30 Hz, 31 Hz, 32 Hz, 33 Hz, 34 Hz, 35 Hz, 36 Hz, 37 Hz, 38 Hz, 39 Hz, 40 Hz, 41 Hz, 42 Hz, 43 Hz, 44 Hz, 45 Hz, 46 Hz, 47 Hz, 48 Hz, 49 Hz, 50 Hz, 51 Hz, 52 Hz, 53 Hz, 54 Hz or 55 Hz in conjunction with the faceplate 14 and/or the golf club head body 10. The harmonics can therefore be centered at about 24 Hz, 25 Hz, 26 Hz, 27 Hz, 28 Hz, 29 Hz, 30 Hz, 31 Hz, 32 Hz, 33 Hz, 34 Hz, 35 Hz, 36 Hz, 37 Hz, 38 Hz, 39 Hz, 40 Hz, 41 Hz, 42 Hz, 43 Hz, 44 Hz, 45 Hz, 46 Hz, 47 Hz, 48 Hz, 49 Hz, 50 Hz, 51 Hz, 52 Hz, 53 Hz, 54 Hz or 55 Hz in conjunction with particular regions of the golf club head assembly 30 (i.e., the toe end, heel end, sole, crown, front, back etc.). The harmonics can therefore be centered at about 24 Hz, 25 Hz, 26 Hz, 27 Hz, 28 Hz, 29 Hz, 30 Hz, 31 Hz, 32 Hz, 33 Hz, 34 Hz, 35 Hz, 36 Hz, 37 Hz, 38 Hz, 39 Hz, 40 Hz, 41 Hz, 42 Hz, 43 Hz, 44 Hz, 45 Hz, 46 Hz, 47 Hz, 48 Hz, 49 Hz, 50 Hz, 51 Hz, 52 Hz, 53 Hz, 54 Hz or 55 Hz in conjunction with weld HAZ of the golf club head assembly 30.

A specific sub-harmonic stress relief frequency is then identified along the leading slope or shoulder of the selected harmonic peak, preferably at a frequency corresponding to harmonic vibration amplitude equal to one third of the peak amplitude of the selected harmonic peak. Mechanical cyclic vibration energy is then applied to the part for extended time duration at the sub-harmonic stress relief frequency so identified.

It has been found that stress relief can be implemented on a wide variety of metal alloys, both soft and hard alloys, and at processing stages at which the alloys are either hot or cold. Further, stress relief can be implemented either during the welding step described above or after welding of the golf club heads assembly 30. Cyclic vibration energy applied at the sub-harmonic stress relief frequency allows dynamic kinetic energy to flow into the metal of the particular region of the golf club assembly 30 including the HAZ when the frequency of cyclic vibration is applied with a low steady stable constant level. Cyclic vibration is a dynamic loading and unloading mechanism that uses the mass-spring relationship found in metal alloys. Compliance of the yield modulus (stiffness) represents the amount of critical (tensile) residual stress retained in the metal structure. When cold mechanical cyclic energy is applied at the sub-harmonic frequency, it redistributes or transforms the unwanted residual stress from weakness to strength. A time soak of low harmonic energy (typically under two hours) provides metal relaxation similar to that gained from two to three years of outdoor aging.

In addition, the heat treatment along with the vibrational stress relief technique can be applied to a variety of materials and a variety of weld-types. Depending upon the region of the golf club head assembly, the faceplate 14 can be treated with as described above over the solvus temperature of the metal or metal composite of the faceplate 14, and then further exposed to the vibrational stress relief technique. The vibrational stress relief technique can further be used in place of the first and second heat treatment steps describe above.

The post-weld vibrational stress relief disperses stresses associated with the weld-metal heat affected zone (HAZ) of the golf club assembly 30, or the area around the weld in which the material properties have been altered due to the welding process. Because of the stark contrast in mechanical properties between the HAZ and the rest of the metal matrix, the HAZ is much more likely to experience a crack and fail. Using the vibrational stress-relief technique in this method prevents the faceplate from flattening or losing its' curvature relatively quickly. The vibrational stress-relieve technique disperses stresses in the weld metal HAZ. The identification of the specific sub-harmonic stress relief frequency along the leading slope or shoulder of the selected harmonic peak of the particular treatment region of golf club head assembly 30 improves the durability of the HAZ by relieving the stresses. In addition, the vibrational stress-relief technique reduces the possibility of generating titanium-aluminum ($Ti_3Al$) crystals along the weld.

III. Iron Type Club Head with High Strength Face Material

Figure 7:
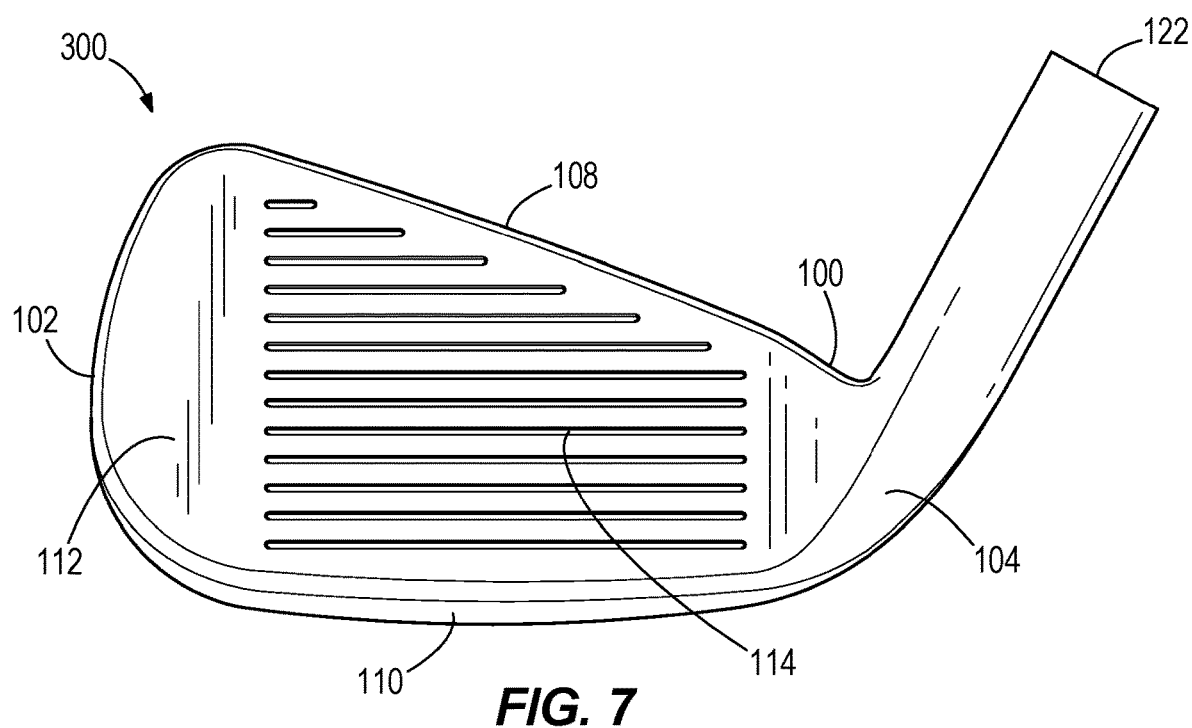
FIG. 7 is a front view of an iron type club head.
Figure 8:
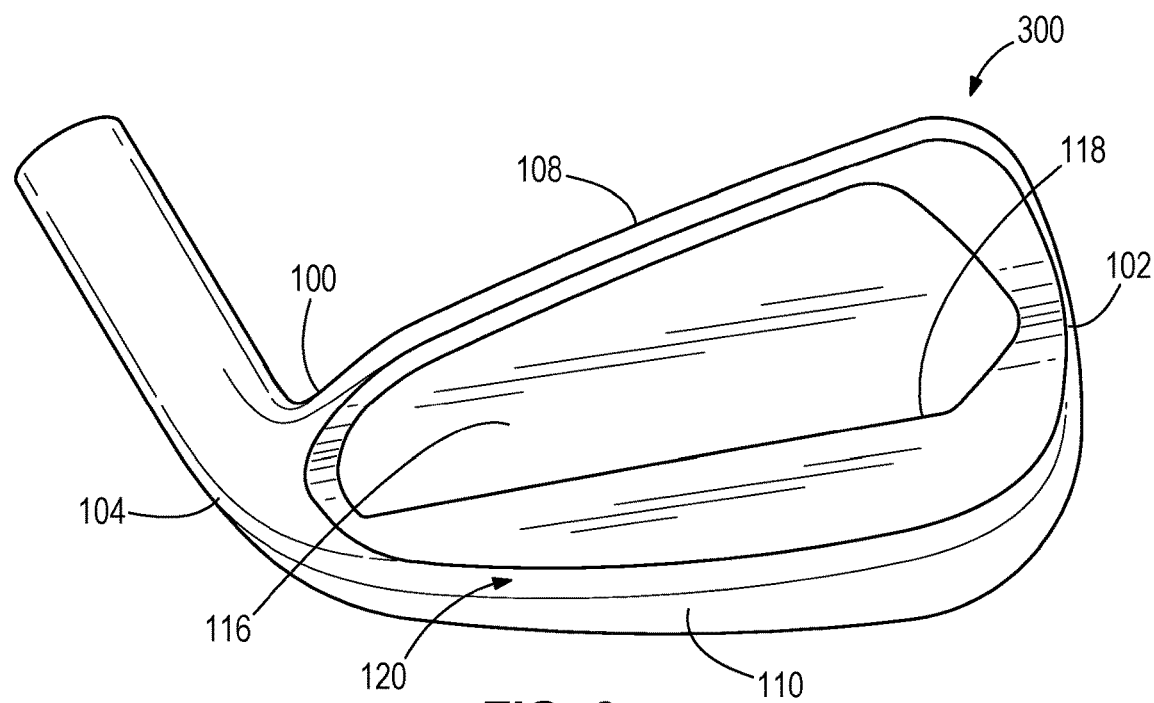
FIG. 8 is a back view of the iron type club head of FIG. 7.

Referring to FIGS. 7 and 8, another embodiment of the club head assembly 300 comprising an iron type golf club head 100, is shown. The golf club head 100 includes a toe portion 102, a heel portion 104, a top portion 108, a bottom portion 110, a front portion 112, a face plate 114, a back portion 116, and a lower back portion 120. A sole of the club head can comprise the bottom portion 110. In the illustrated embodiment, the golf club head 100 includes a cavity 118 in the back portion 120 of the golf club head. In other embodiment, the golf club head 100 can include a solid back portion. Further, the golf club head 100 can include a welded portion (a piece that is heat treated before being welded onto the club head assembly). The welded portion can comprise any of the aforementioned portions of the club head 100. The welded portion can be formed and heat treated separately, and then welded to the other portions of the club head 100, forming the club head assembly 300. The golf club head 100 can be formed from a first material and the welded portion can be formed from a second material. The first material can be a cast material, a forged material, a machined material, a rolled material or any other suitable material. The second material can be the same or different than the first material and can be a cast material, a forged material, a machined material, a rolled material or any other suitable material.

The club head 100 can also include a hosel and a hosel transition (shown as 122). For example, the hosel can be located at or proximate to the heel end 104. The hosel can extend from the club head 100 via the hosel transition 122. To form a golf club, the hosel can receive a first end of a shaft 20 (FIG. 1). The shaft 20 can be secured to the golf club head 10 by an adhesive bonding process (e.g., epoxy) and/or other suitable bonding processes (e.g., mechanical bonding, soldering, welding, and/or brazing). Further, a grip (not shown) can be secured to a second end of the shaft 20 to complete the golf club.

A. Faceplate as Welded Portion

Figure 9:
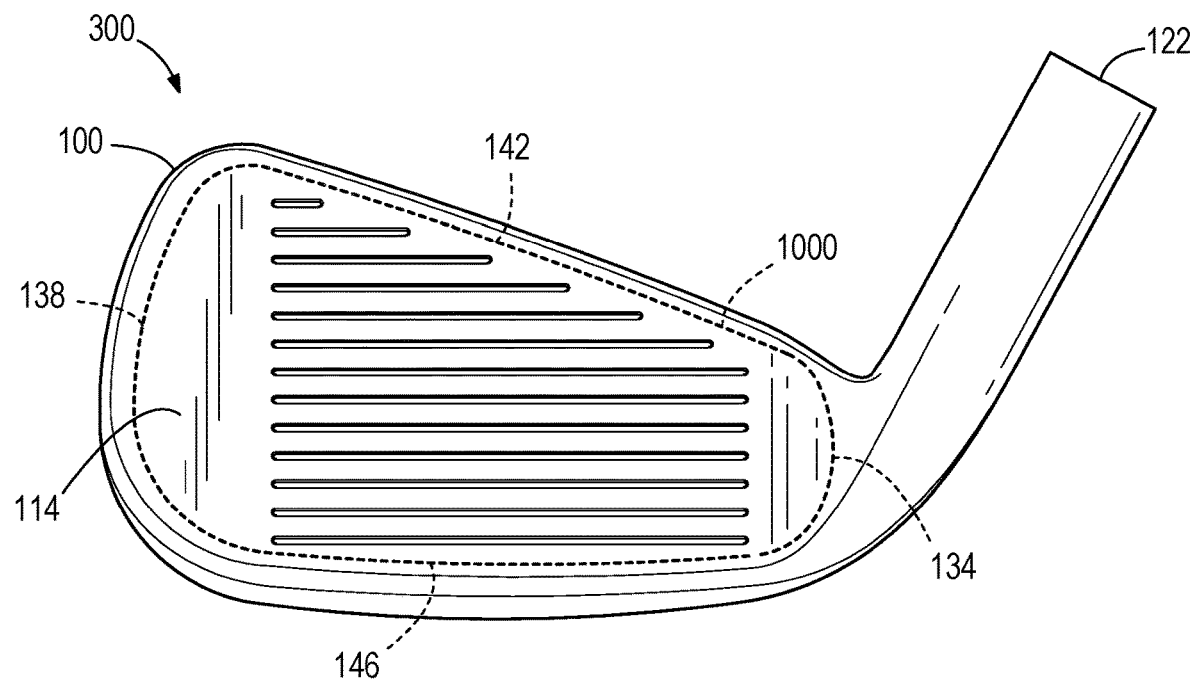
FIG. 9 is a front view of an iron type club head having a welded portion.

In one embodiment, referring to FIG. 9, the faceplate 114 comprises the welded portion of the club head 100. The welded portion is illustrated using the dashed line 1000. The club head 100 is similar to the club head 10 as it comprises a recess or opening (not shown) for receiving the faceplate 114. Similarly to club head 10, the opening includes a lip (not shown) extending around the perimeter of the opening. The shape of the opening, as defined by the lip, generally follows the shape of the body of the club head, as seen from a front view, such as FIG. 9. The lip extends roughly parallel to an upper edge of the club head and roughly parallel with the bottom portion of the club head. Furthermore, adjacent the heel, the opening ends where the contour of the club head begins to transition to the hosel 122. Adjacent the toe, the opening follows the contour of the toe of the club head 100. The faceplate 114 is aligned with the opening and abuts the lip. As discussed below, the faceplate 114 is secured to the club head 100 by welding, forming the club head assembly 300.

The faceplate 114 includes a heel end 134 and a toe end 138 opposite the heel end 134. The heel end 134 is positioned proximate the hosel portion (hosel and hosel transition 122) where the shaft 20 (FIG. 1) is coupled to the club head assembly 300. The faceplate 114 further includes a crown edge 142 and a sole edge 146 opposite the crown edge 142. The crown edge 142 is positioned adjacent an upper edge of the club head 100, while the sole edge 146 is positioned adjacent the lower edge of the club head 100. In one embodiment, the faceplate can have a minimum wall thickness of 0.8 millimeters to 2.5 millimeters. For example, the faceplate can have a thickness of less than 2.5 millimeters, less than 2.4 millimeters, less than 2.3 millimeters, less than 2.2 millimeters, less than 2.1 millimeters, less than 2.0 millimeters, less than 1.9 millimeters, less than 1.8 millimeters, less than 1.7 millimeters, less than 1.6 millimeters, less than 1.5 millimeters, less than 1.4 millimeters, less than 1.3 millimeters, less than 1.2 millimeters, less than 1.1 millimeters, less than 1.0 millimeters, less than 0.9 millimeters, or less than 0.8 millimeters. In one embodiment, the faceplate can have a minimum wall thickness of 1.7 millimeters.

B. Front Portion as Welded Portion

Figure 10:
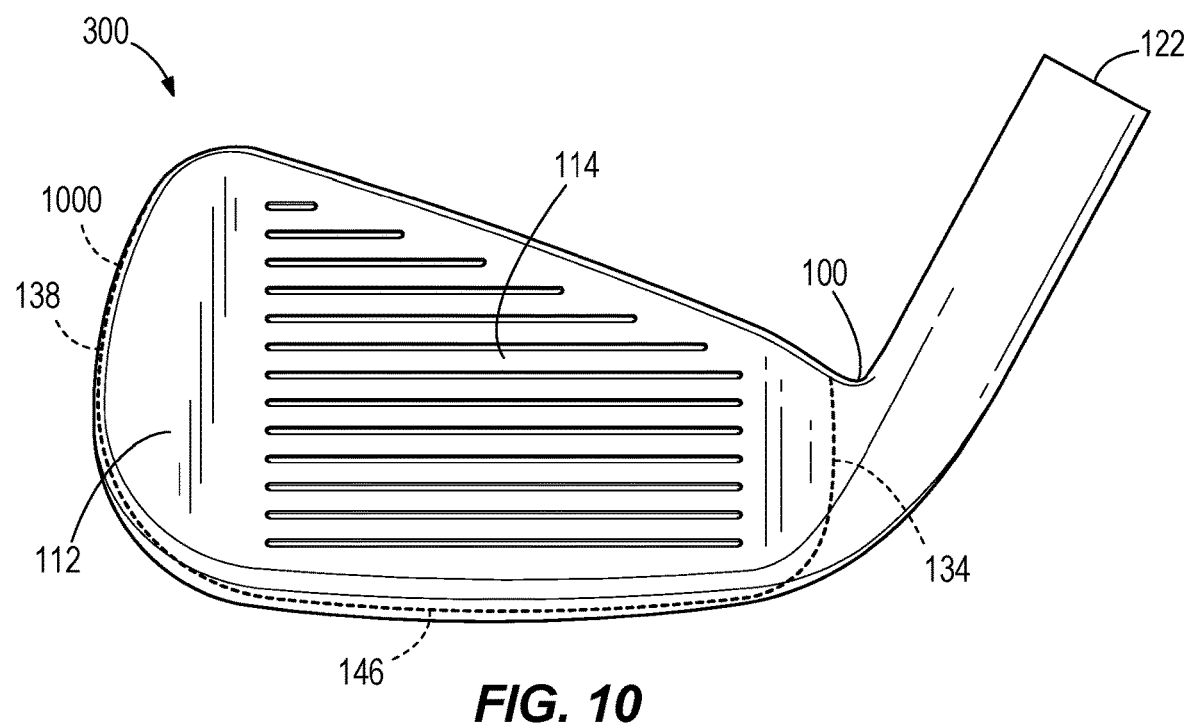
FIG. 10 is a front view of another embodiment of an iron type club head having a welded portion.
Figure 11:
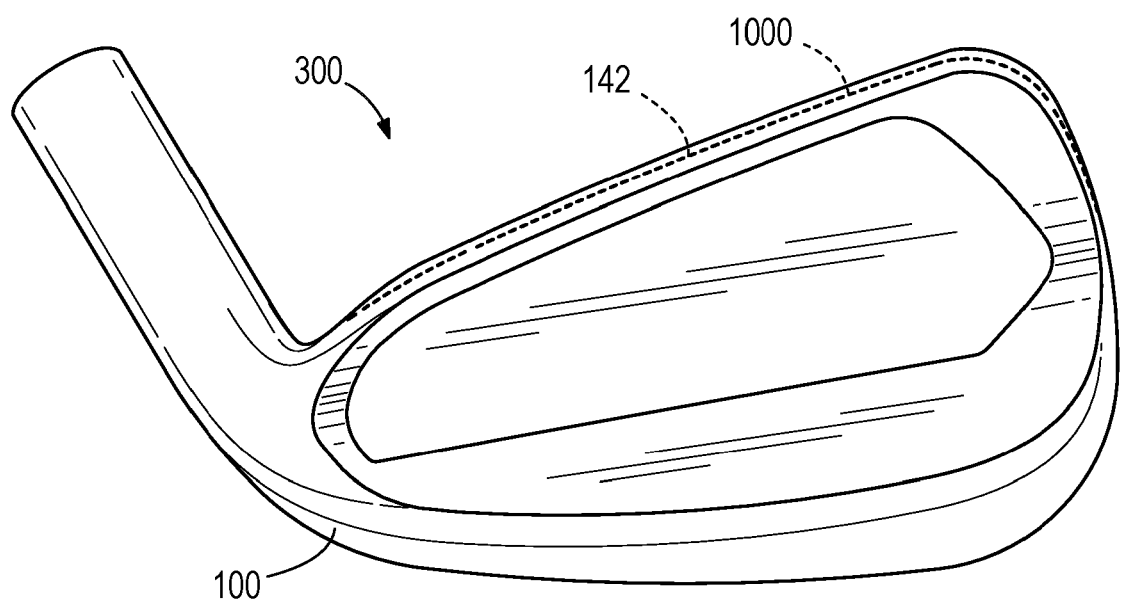
FIG. 11 is a back view of the iron type club head of FIG. 10.

In another embodiment, referring to FIGS. 10 and 11, the front portion 112 comprises the welded portion of the club head 100. The welded portion is illustrated using the dashed line 1000. The club head 100 is similar to the club head 10 as it comprises a recess or opening (not shown) for receiving the front portion 112. The welded portion of the front portion 112 comprises the face plate 114, a heel end 134, a toe end 138, and a section that wraps onto the top portion 108 of the club head 100. The welded portion of the front portion 112 can be aligned with the opening and received onto a lip (not shown) of the opening of the club head 100. The lip extends around the perimeter of the opening of the club head 100, similar to club head 10. As discussed below, the front portion 112 is secured to the club head 100 by welding, forming the club head assembly 300.

As mentioned above, the welded portion of the front portion 112 includes the heel end 134 and the toe end 138 opposite the heel end 134. The heel end 134 is positioned proximate the hosel portion (hosel and hosel transition 122) where the shaft 20 (FIG. 1) is coupled to the club head assembly 300. The welded portion of the front portion 112 further includes a crown edge 142 and a sole edge 146 opposite the crown edge 142. The crown edge 142 is positioned adjacent an upper edge of the club head 100, while the sole edge 146 is positioned adjacent the lower edge of the club head 100, near the bottom portion 110 (or sole). In some embodiments, the faceplate 114 is an insert and can be coupled to the front portion 112 after it has been welded to the club head 100.

The lip of the opening of the club head 100 runs along a portion of the bottom portion 110 (or sole) from the heel portion 104 to the toe portion 102 of the club head 100. The lip of the opening also runs along the top portion 108 of the club head 100. In some embodiments, the portion of the lip of the opening along the top portion 108 is not visible from a front view when the welded portion of the front portion 112 is placed in position. The portion of the lip of the opening running along the top portion 108 of the club head 100 can be visible from a rear view such as FIG. 11 when the welded portion of the front portion 112 is placed in position. The lip of the opening also runs along the toe portion 102, following the contour of the golf club head as viewed from a front view, such as FIG. 10. The lip of the opening aligns and holds the welded portion of the front portion 112 in place during welding.

C. Back Portion as Welded Portion

Figure 12:
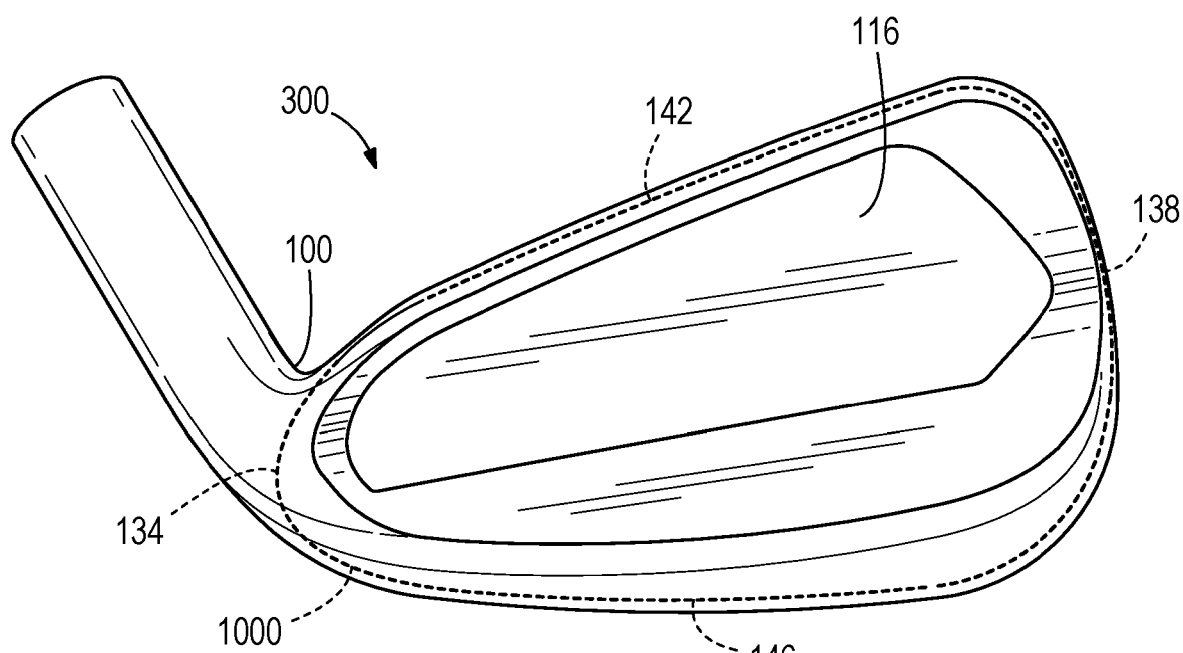
FIG. 12 is a back view of another embodiment of an iron type club head having a welded portion.
Figure 13:
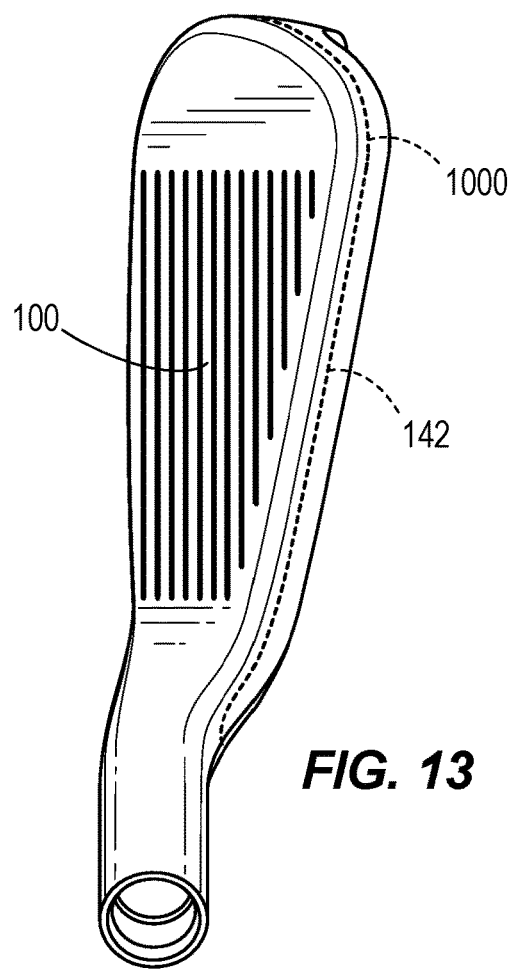
FIG. 13 is a top view of the iron type club head of FIG. 12.

In another embodiment, referring to FIGS. 12 and 13, the back portion 116 comprises the welded portion of the club head 100. The welded portion is illustrated using the dashed line 1000. The club head 100 is similar to the club head 10 as it comprises a recess or opening (not shown) for receiving the back portion 116. The welded portion of the back portion 116 accounts for over 80% of the visible surface area of the back portion 116 of the club head, when the club head is at address position and viewed from a rear view, as illustrated in FIG. 12. The welded portion of the back portion 116 is bounded by a heel end 134, a toe end 138, a crown edge 142, and a sole edge 146. The welded portion of the back portion 116 comprises a shape generally corresponding to a peripheral edge of the club head 100 when the club head 100 is viewed from a rear view in address position. The welded portion of the back portion 116 can be aligned with the opening and received onto a lip (not shown) of the opening of the club head 100. The lip extends around the perimeter of the opening of the club head 100, similar to club head 10. As discussed below, the back portion 116 is secured to the club head 100 by welding, forming the club head assembly 300.

As mentioned above, the welded portion of the back portion 116 includes the heel end 134 and the toe end 138 opposite the heel end 134. The heel end 134 is positioned proximate the hosel portion (hosel and hosel transition 122) where the shaft 20 (FIG. 1) is coupled to the club head assembly 300. The welded portion of the back portion 116 further includes a crown edge 142 and a sole edge 146 opposite the crown edge 142. The crown edge 142 is positioned adjacent an upper edge of the club head 100, while the sole edge 146 is positioned adjacent the lower edge of the club head 100. The crown edge 142 roughly follows the contours of the upper edge of the club head 100, and the sole edge 146 roughly follows the contours of the lower edge of the club head 100, adjacent the bottom portion 110 (or sole). In the illustrated embodiment, the back portion 116 includes a cavity style back. In other embodiments, the back portion 116 can comprise a blade or solid style back.

The lip of the opening follows the contours of the golf club head as seen from a rear view, such as in FIG. 12. In some embodiments, the opening and its lip cannot be seen from a front view of the golf club head 100, when the golf club head 100 is at address position. The lip of the opening aligns and holds the welded portion of the back portion 116 in place during welding.

D. Lower Back Portion as Welded Portion

Figure 14:
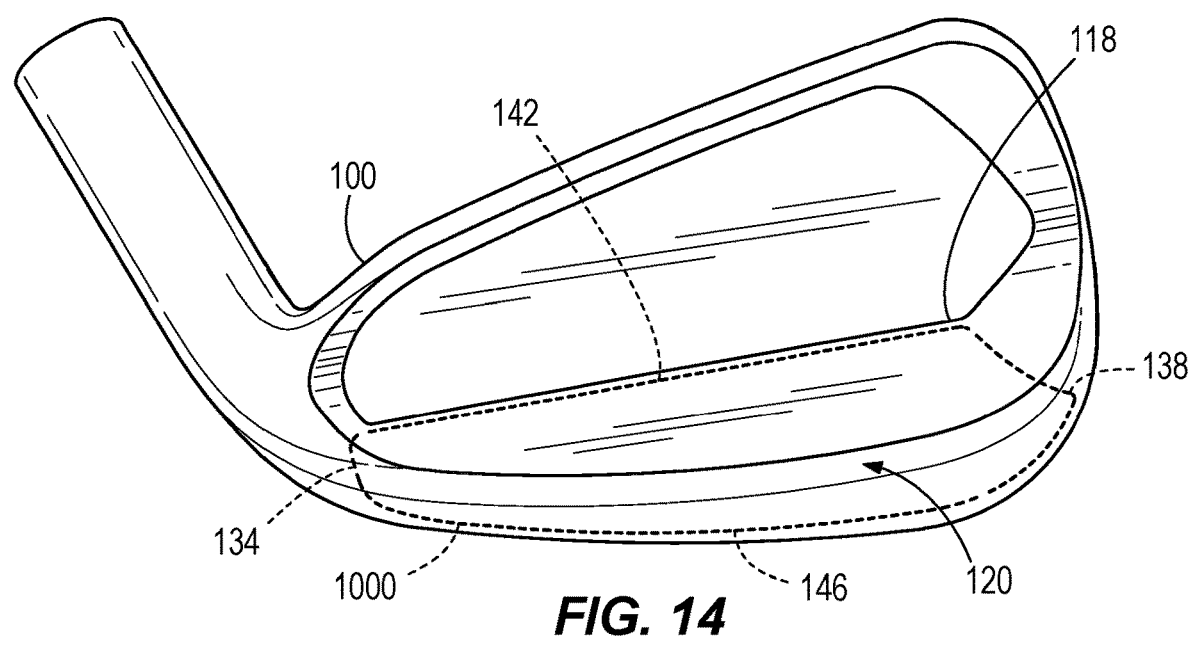
FIG. 14 is a back view of another embodiment of an iron type club head having a welded portion.

In another embodiment, referring to FIG. 14, lower back portion 120 comprises the welded portion of the club head 100. The welded portion is illustrated using the dashed line 1000. The club head 100 is similar to the club head 10 as it comprises a recess or opening (not shown) for receiving the welded portion of the lower back portion 120. The opening is below and adjacent to an opening of the back cavity 118 of the club head 100. The outlined welded portion is located within the lower back portion 120, which is within the bottom half of the club head 100. The lower back portion 120 stretches across the back portion 116 from the toe portion 102 to the heel portion 104 of the golf club head 100. The welded portion comprises a heel end 134, a toe end 138, a top edge 142, and a sole edge 146. The welded portion of the lower back portion 120 can be aligned with the opening and received onto a lip (not shown) of the opening of the golf club head 100. The lip extends around the perimeter of the opening of the club head 100, similar to club head 10. As discussed below, the welded portion of the lower back portion 120 is secured to the club head 100 by welding, forming the club head assembly 300.

The welded portion of the lower back portion 120 includes a heel end 134 and a toe end 138 opposite the heel end 134. The heel end 134 is positioned proximate the hosel portion (hosel and hosel transition 122) where the shaft 20 (FIG. 1) is coupled to the club head assembly 300. The welded portion of the lower back portion 120 further includes a top edge 142 and a sole edge 146 opposite the top edge 142. The top edge 142 is positioned adjacent an upper edge of the back wall of the cavity 118, while the sole edge 146 is positioned adjacent the lower edge of the club head 100. In the illustrated embodiment, the lower back portion 120 comprises the back wall of the cavity 118. In other embodiments, the lower back portion 120 can comprise a weighted portion of a solid back portion 116. In some embodiments, sections of the back wall of the cavity 118, the toe portion 102, and the bottom portion 110 (or sole) of the club head 100 comprise the welded portion of the lower back portion 120.

E. Bottom Portion as Welded Portion

Figure 16:
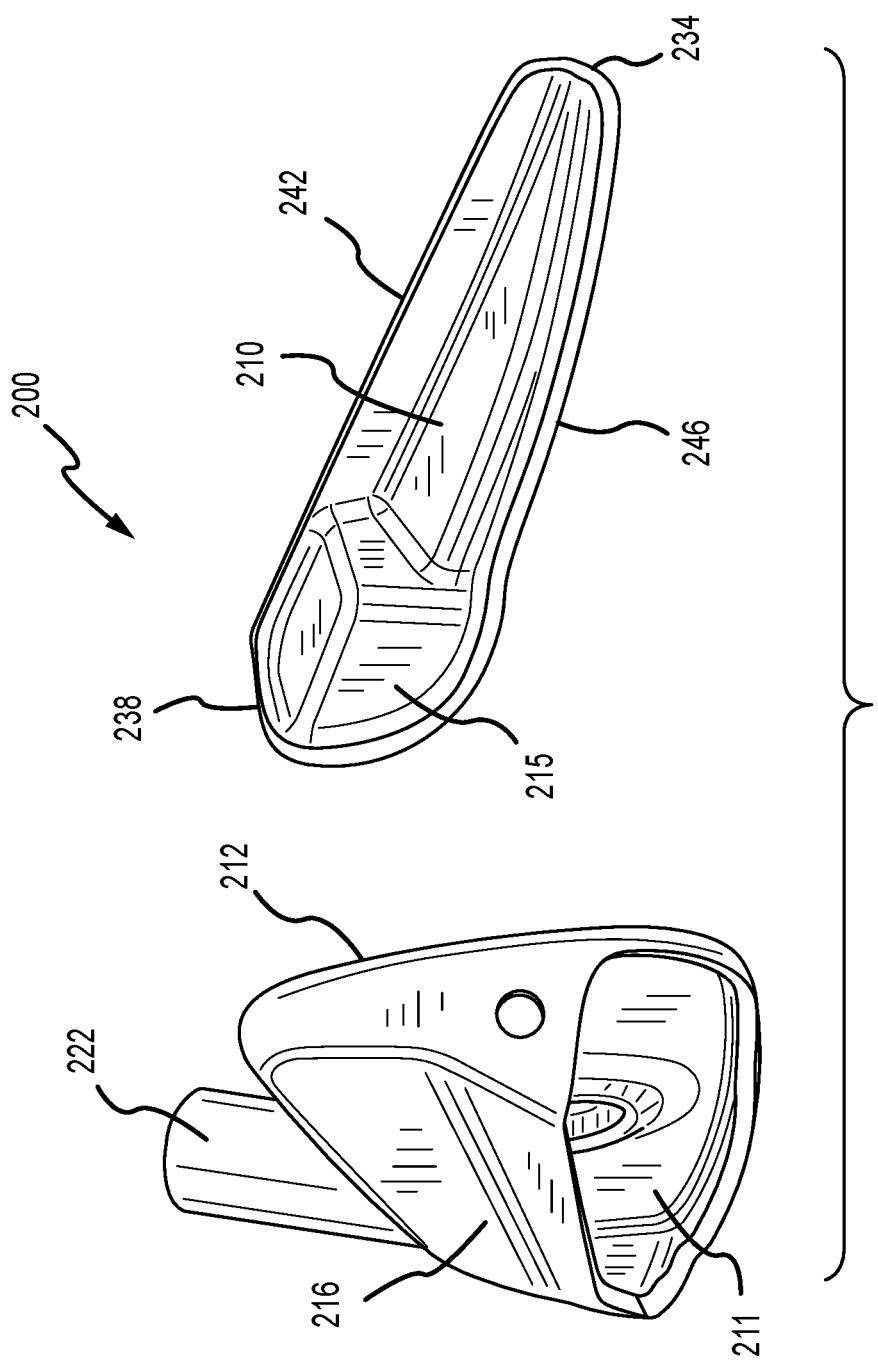
FIG. 16 is a perspective view of another embodiment of an iron type club head having a welded portion.

In another embodiment, referring to FIG. 16, the bottom portion 210 comprises the welded portion of a club head 200. The club head 200 is similar to the club heads 10 and 100 except the club head 200 is a does not have a cavity 118 in the back portion 116. Similarly to club heads 10 and 100, the club head 200 includes an opening or recess 211. The opening or recess 211 can extend across a sole and a rear portion of the club head 200 from the toe portion to the heel portion of the club head 200. The opening 211 includes a lip extending around the perimeter of the opening 211. The bottom portion 210 can form part of the back portion 216. The bottom portion 210 can form part of the toe portion of the club head 200. The bottom portion 210 can form part of the sole of the club head 200. In some embodiments, the bottom portion 210 comprises a majority of the sole of the club head 200. As discussed below, bottom portion 210 is secured to the club head 200 by welding, forming the club head 200 assembly.

The bottom portion 210 includes a heel end 234 and a toe end 238 opposite the heel end 234. The heel end 234 is positioned proximate the hosel portion (hosel and hosel transition 222) where the shaft 20 (FIG. 1) is coupled to the club head assembly 300. The bottom portion 210 further includes a back edge 242 and a front edge 246 opposite the back edge 242. The back edge 242 is positioned adjacent to a lower edge on the back portion 216 of the club head 200, while the front edge 246 is positioned adjacent to a lower edge of the front portion 212 of the club head 200. In some embodiments, a wall of the bottom portion 210, adjacent the back edge 242, forms a section of the back portion 216 of the golf club 200 assembly. In some embodiments, a wall of the bottom portion 210, adjacent the front edge 246, forms a section of the sole of the golf club head 200 assembly.

The welded portion of the bottom portion 210 is aligned with the opening 211 and abuts the lip of the opening 211.

The lip of the opening 211 can comprise a segment on the back portion 216 of the club head 200. The lip of the opening 211 can comprise a segment on the toe portion of the club head 200. The lip of the opening 211 can comprise a segment on the sole of the club head 200.

In the illustrated embodiment, the bottom portion 210 comprises an extra weighted portion 215 in the toe end 238. In other embodiments, the bottom portion 210 can comprise an extra weighted portion 215 in the heel end 234 or at any position in between the toe end 238 and the heel end 243. In other embodiments, the bottom portion 210 can be formed without an extra weight portion 215. Changing the position of the weighted portion 215 within the bottom portion 210 can manipulate the club head 200 center of gravity. For example, the weighted portion 215 can create a lower club head 200 center of gravity, increasing the MOI and performance of the golf club head 200.

F. Hosel as Welded Portion

Figure 17:
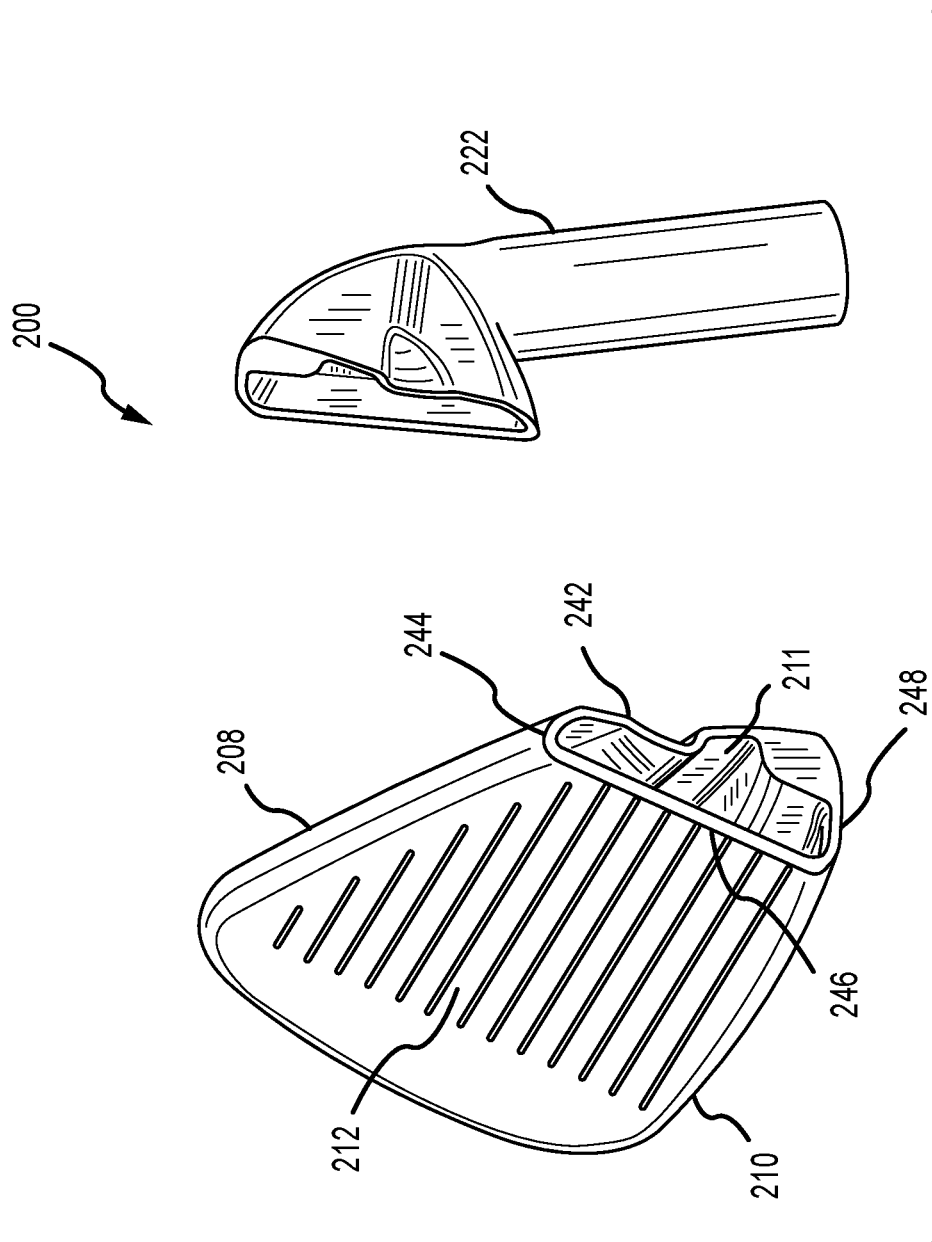
FIG. 17 is a perspective view of another embodiment of an iron type club head having a welded portion.

In another embodiment, referring to FIG. 17, the hosel 222 comprises the welded portion of the club head 200. The hosel 222 can comprise a hosel transition portion and a heel portion of the golf club head. The club head 200 is similar to the club heads 10 and 100 except the club head 200 is a does not have a cavity 118 in the back portion 116. Similarly to club heads 10 and 100, the club head 200 includes an opening or recess 211. The opening 211 is located on a plane defined orthogonal to the front portion 212 and adjacent the heel portion of the golf club head 100. The void within the club head 200 opens towards a heel region, such that the when the club is at address position, the opening is not visible from a toe side view of the club head 200. The opening 211 includes a lip extending around the perimeter of the opening 211. As discussed below, hosel 222 is secured to the club head 200 by welding, forming the club head 200 assembly.

The portion of the club head 200 that connects to the hosel 222 includes a front edge 246, a back edge 242, a top edge 244 and a bottom edge 248. The front edge 246, the back edge 242, the top edge 244, and the bottom edge 248 are positioned on the reference plane that comprises the opening 211. The front edge 246, the back edge 242, the top edge 244, and the bottom edge 248 define a perimeter of the opening 211. The front edge 246 is positioned on the front portion 212 and adjacent to the heel of the club head 200. The back edge 242 is positioned on the back portion 216 and adjacent to the heel of the club head 200. The top edge 244 is positioned on the top portion 208 and adjacent to the heel of the club head 200. The bottom edge 248 is positioned on the bottom portion 210 and adjacent to the heel of the club head 200. The hosel 222 is welded to the club head 200 along these edges to form the club head 200 assembly.

IV. Iron Type Club Head Materials

As discussed above, the club head 100 portion can comprise a first material and the welded portion can comprise a second material. The first material can be a cast material, a forged material, a machined material, a rolled material or any other suitable material. The second material can be the same or different than the first material and can be a cast material, a forged material, a machined material, a rolled material or any other suitable material.

In some embodiments, the portion of the club head assembly 300 which comprises the hosel and the hosel transition 122 can comprise a soft, and ductile material to aid in lie angle bending, while the portion of the club head assembly 300 comprising the faceplate 114 can comprise a high strength, harder material to aid in groove wear and ball speed. For example, the portion of the club head assembly 300 containing the hosel and hosel transition 122 can comprise a 17-4 stainless steel, a 4340 steel alloy, a 4140 steel alloy, a 1025 steel alloy, a S45C steel alloy, or a 8620 steel alloy, while the portion of the club head assembly 300 comprising the faceplate 114 can comprise a 17-4 stainless steel, a 15-5 stainless steel, a 4340 steel alloy, a 4140 steel alloy, a M54 steel alloy, a 300M steel alloy, or an H11 steel alloy.

In other embodiments, the portion of the club head assembly 300, which comprises the hosel and the hosel transition 122, can comprise a high strength, hard material, while the portion of the club head assembly 300 comprising the faceplate 114 can comprise a softer, more ductile material. For example, the portion of the club head assembly 300 containing the hosel and hosel transition 122 can comprise a 17-4 stainless steel, a 15-5 stainless steel, a 4340 steel alloy, a 4140 steel alloy, a M54 steel alloy, a 300M steel alloy, or an H11 steel alloy, while the portion of the club head assembly 300 comprising the faceplate 114 can comprise a 17-4 stainless steel, a 4340 steel alloy, a 4140 steel alloy, a 1025 steel alloy, a S45C steel alloy, or a 8620 steel alloy.

In some embodiments the first or second material can comprise a 17-4 stainless steel alloy having approximately 15.0-17.5% chromium, approximately 3.0-5.0% nickel, approximately 2.8-3.5% copper, with the remaining alloy composition being iron and other trace elements including approximately 0.15-0.45% niobium, less than or equal to 0.07% carbon, less than or equal to 1.0% manganese, less than or equal to 0.5% molybdenum, less than or equal to 0.05% nitrogen, less than or equal to 0.05% oxygen, less than or equal to 0.04% phosphorus, less than or equal to 0.03% sulfur, and less than or equal to 1.0% silicon. The solution temperature for 17-4 stainless steel is approximately 1040° C. The 17-4 stainless steel has a density of 0.28 lb/in$^3$ (7.78 g/cc).

In some embodiments the first or second material can comprise a 15-5 stainless steel alloy having approximately 0.7-0.9% chromium, approximately 1.65-2% nickel with the remaining alloy composition being iron and other trace elements including approximately 0.6-0.8% manganese, approximately 0.37-0.43% carbon, approximately 0.2-0.3% molybdenum, approximately 0.15-0.3% silicon, less than or equal to 0.04% sulfur, less than or equal to 0.035% phosphorus. The solution temperature for 15-5 stainless steel is approximately 1040° C.15-5 stainless steel has a density of 0.28 lb/in$^3$ (7.78 g/cc).

In some embodiments the first or second material can comprise a 4340 steel alloy having approximately 14.0-15.5% chromium, approximately 3.5-5.5% nickel, approximately 2.5-4.5% copper, with the remaining alloy composition being iron and other trace elements including approximately 0.15-0.45% niobium, less than or equal to 0.07% carbon, less than or equal to 1.0% manganese, less than or equal to 0.04% phosphorus, less than or equal to 0.03% sulfur, and less than or equal to 1.0% silicon. The solution temperature for 4340 steel alloy is approximately 850° C. The 4340 steel alloy has a density of 0.284 lb/in$^3$ (7.85 g/cc).

In some embodiments the first or second material can comprise a 4140 steel alloy having approximately 0.8-1.1% chromium, approximately 0.75-1.0% manganese, with the remaining alloy composition being iron and other trace elements including approximately 0.38-0.43% carbon, approximately 0.15-0.30% silicon, approximately 0.15-0.25% molybdenum, less than or equal to 0.04% sulfur, and less than or equal to 0.035% phosphorous. The solution temperature for 4140 steel alloy is approximately 845° C. The 4140 steel alloy has a density of 0.284 lb/in³ (7.85 g/cc).

In some embodiments the first or second material can comprise a M54 steel alloy having approximately 1% chromium, approximately 10% nickel, approximately 7% cobalt, approximately 2.0% molybdenum, approximately 1.3% tungsten with the remaining alloy composition being iron and other trace elements including approximately 0.3% carbon, and less than or equal to 0.1% vanadium. The solution temperature for M54 steel alloy is approximately 1080° C. The M54 steel alloy has a density of 0.288 lb/in³ (7.98 g/cc).

In some embodiments the first or second material can comprise a 300M steel alloy having approximately 0.7-0.95% chromium, approximately 1.65-2.0% nickel, approximately 1.45-1.8% silicon with the remaining alloy composition being iron and other trace elements including approximately 0.4-0.46% carbon, approximately 0.65-0.90% manganese, approximately 0.3-0.45% molybdenum, less than or equal to 0.035% phosphorous, less than or equal to 0.05% vanadium, less than or equal to 0.40% sulfur. The solution temperature for 300M steel alloy is approximately 930° C. The 300M steel alloy has a density of 0.284 lb/in³ (7.87 g/cc).

In some embodiments the first or second material can comprise a H11 steel alloy having approximately 4.75-5.5% chromium, approximately 1.10-1.60% molybdenum, approximately 0.8-1.2% silicon with the remaining alloy composition being iron and other trace elements including approximately 0.33-0.43% carbon, approximately 0.2-0.5% manganese, approximately 0.3-0.6% vanadium, less than or equal to 0.25 copper, less than or equal to 0.03% phosphorous, less than or equal to less than or equal to 0.03% sulfur, less than or equal to 0.3% nickel. The solution temperature for H11 steel alloy is approximately 1000° C. The H11 steel alloy has a density of 0.284 lb/in³ (7.87 g/cc).

In some embodiments the first or second material can comprise a 1025 steel alloy having approximately 0.22-0.28% carbon, approximately 0.30-0.60% manganese with the remaining alloy composition being iron and other trace elements including less than or equal to 0.05 sulfur, less than or equal to 0.04% phosphorous. The solution temperature for 1025 steel alloy is approximately 910° C. The 1025 steel alloy has a density of 0.2839 lb/in³ (7.85 g/cc).

In some embodiments the first or second material can comprise a S45C steel alloy having approximately 0.42-0.48% carbon, approximately 0.6-0.9% manganese with the remaining alloy composition being iron and other trace elements including approximately 0.15-0.35% silicon, less than or equal to 0.035 sulfur, less than or equal to 0.03% phosphorous. The solution temperature for S45C steel alloy is approximately 880° C. The S45C steel alloy has a density of 0.284 lb/in³ (7.86 g/cc).

In some embodiments the first or second material can comprise a 8620 steel alloy having approximately 0.4-0.6% chromium, approximately 0.7-0.9% manganese, approximately 0.4-0.7 manganese with the remaining alloy composition being iron and other trace elements including approximately 0.18-0.23 carbon, approximately 0.15-0.35% silicon, approximately 0.15-0.25 molybdenum, less than or equal to 0.04 sulfur, less than or equal to 0.035% phosphorous. The solution temperature for 8620 steel alloy is approximately 915° C. The 8620 steel alloy has a density of 0.284 lb/in³ (7.85 g/cc).

1. Faceplate as Welded Portion Materials

In some embodiments, wherein the welded portion comprises the faceplate 114, the second material can be a harder material and the first material can be a softer material. For example, the welded portion can comprise a 17-4 stainless steel, a 15-5 stainless steel, a 4340 steel alloy, a 4140 steel alloy, a M54 steel alloy, a 300M steel alloy, or an H11 steel alloy and the first material can comprise a 17-4 stainless steel, a 4340 steel alloy, a 4140 steel alloy, a 1025 steel alloy, a S45C steel alloy, or a 8620 steel alloy. In other embodiments, the second material can comprise a softer material and the first material can comprise a harder material. For example, the welded portion can comprise a 17-4 stainless steel, a 4340 steel alloy, a 4140 steel alloy, a 1025 steel alloy, a S45C steel alloy, or a 8620 steel alloy and the first material can comprise a 17-4 stainless steel, a 15-5 stainless steel, a 4340 steel alloy, a 4140 steel alloy, a M54 steel alloy, a 300M steel alloy, or an H11 steel alloy. In other embodiments, the first material and the second material can comprise the same softer material or can comprise the same harder material.

2. Front Portion as Welded Portion Materials

In some embodiments, wherein the welded portion comprises the front portion 112, the second material can be a harder material and the first material can be a softer material. For example, the welded portion can comprise a 17-4 stainless steel, a 15-5 stainless steel, a 4340 steel alloy, a 4140 steel alloy, a M54 steel alloy, a 300M steel alloy, or an H11 steel alloy and the first material can comprise a 17-4 stainless steel, a 4340 steel alloy, a 4140 steel alloy, a 1025 steel alloy, a S45C steel alloy, or a 8620 steel alloy. In other embodiments, the second material can comprise a softer material and the first material can comprise a harder material. For example, the welded portion can comprise a 17-4 stainless steel, a 4340 steel alloy, a 4140 steel alloy, a 1025 steel alloy, a S45C steel alloy, or a 8620 steel alloy and the first material can comprise a 17-4 stainless steel, a 15-5 stainless steel, a 4340 steel alloy, a 4140 steel alloy, a M54 steel alloy, a 300M steel alloy, or an H11 steel alloy. In other embodiments, the first material and the second material can comprise the same softer material or can comprise the same harder material.

3. Back Portion as Welded Portion Materials

In some embodiments, wherein the welded portion comprises the back portion 116, the second material can be a harder material and the first material can be a softer material. For example, the welded portion can comprise a 17-4 stainless steel, a 15-5 stainless steel, a 4340 steel alloy, a 4140 steel alloy, a M54 steel alloy, a 300M steel alloy, or an H11 steel alloy and the first material can comprise a 17-4 stainless steel, a 4340 steel alloy, a 4140 steel alloy, a 1025 steel alloy, a S45C steel alloy, or a 8620 steel alloy. In other embodiments, the second material can comprise a softer material and the first material can comprise a harder material. For example, the welded portion can comprise a 17-4 stainless steel, a 4340 steel alloy, a 4140 steel alloy, a 1025 steel alloy, a S45C steel alloy, or a 8620 steel alloy and the first material can comprise a 17-4 stainless steel, a 15-5 stainless steel, a 4340 steel alloy, a 4140 steel alloy, a M54 steel alloy, a 300M steel alloy, or an H11 steel alloy. In other embodiments, the first material and the second material can comprise the same softer material or can comprise the same harder material.

4. Back Portion as Welded Portion Materials

In some embodiments, wherein the welded portion comprises the lower back portion 120, the second material can be a harder material and the first material can be a softer material. For example, the welded portion can comprise a 17-4 stainless steel, a 15-5 stainless steel, a 4340 steel alloy, a 4140 steel alloy, a M54 steel alloy, a 300M steel alloy, or an H11 steel alloy and the first material can comprise a 17-4 stainless steel, a 4340 steel alloy, a 4140 steel alloy, a 1025 steel alloy, a S45C steel alloy, or a 8620 steel alloy. In other embodiments, the second material can comprise a softer material and the first material can comprise a harder material. For example, the welded portion can comprise a 17-4 stainless steel, a 4340 steel alloy, a 4140 steel alloy, a 1025 steel alloy, a S45C steel alloy, or a 8620 steel alloy and the first material can comprise a 17-4 stainless steel, a 15-5 stainless steel, a 4340 steel alloy, a 4140 steel alloy, a M54 steel alloy, a 300M steel alloy, or an H11 steel alloy. In other embodiments, the first material and the second material can comprise the same softer material or can comprise the same harder material.

5. Bottom Portion as Welded Portion Materials

In some embodiments, wherein the welded portion comprises the bottom portion 110, 210, the second material can be a heavier material and the first material can be a lighter material. In other words, the second material, that forms the bottom portion, can have a higher density than the first material, that forms the body of the club head. For example, the welded portion can comprise a 17-4 stainless steel, a 15-5 stainless steel, a 4340 steel alloy, a 4140 steel alloy, a M54 steel alloy, a 300M steel alloy, or an H11 steel alloy and the first material can comprise a 17-4 stainless steel, a 4340 steel alloy, a 4140 steel alloy, a 1025 steel alloy, a S45C steel alloy, or a 8620 steel alloy. In other embodiments, the second material can comprise a lighter material and the first material can comprise a denser, heavier material. For example, the welded portion can comprise a 17-4 stainless steel, a 4340 steel alloy, a 4140 steel alloy, a 1025 steel alloy, a S45C steel alloy, or a 8620 steel alloy and the first material can comprise a 17-4 stainless steel, a 15-5 stainless steel, a 4340 steel alloy, a 4140 steel alloy, a M54 steel alloy, a 300M steel alloy, or an H11 steel alloy. In other embodiments, the first material and the second material can comprise the same lighter material or can comprise the same heavier, denser material. In other embodiments, the bottom portion 110, 210 can comprise multiple materials. For example, the bottom portion 110, 210 can comprise a second material and a weighted portion 215 can comprise a third material. In these or other embodiments, the bottom portion 110, 210 can comprise a 17-4 stainless steel, a 15-5 stainless steel, a 4340 steel alloy, a 4140 steel alloy, a M54 steel alloy, a 300M steel alloy, an H11 steel alloy, a 1025 steel alloy, a S45C steel alloy, or a 8620 steel alloy and a weight portion 215 of the bottom portion can comprise tungsten, molybdenum, silver, lead, copper, iron, cobalt or any other suitable heavy metal.

6. Hosel as Welded Portion Materials

In some embodiments, wherein the welded portion comprises the hosel 222, the second material can be a harder material and the first material can be a softer material. For example, the welded portion can comprise a 17-4 stainless steel, a 15-5 stainless steel, a 4340 steel alloy, a 4140 steel alloy, a M54 steel alloy, a 300M steel alloy, or an H11 steel alloy and the first material can comprise a 17-4 stainless steel, a 4340 steel alloy, a 4140 steel alloy, a 1025 steel alloy, a S45C steel alloy, or a 8620 steel alloy. In other embodiments, the second material can comprise a softer material and the first material can comprise a harder material. For example, the welded portion can comprise a 17-4 stainless steel, a 4340 steel alloy, a 4140 steel alloy, a 1025 steel alloy, a S45C steel alloy, or a 8620 steel alloy and the first material can comprise a 17-4 stainless steel, a 15-5 stainless steel, a 4340 steel alloy, a 4140 steel alloy, a M54 steel alloy, a 300M steel alloy, or an H11 steel alloy. In other embodiments, the first material and the second material can comprise the same softer material or can comprise the same harder material.

V. Method of Forming Iron Type Club Head with High Strength Face Material

Figure 15:
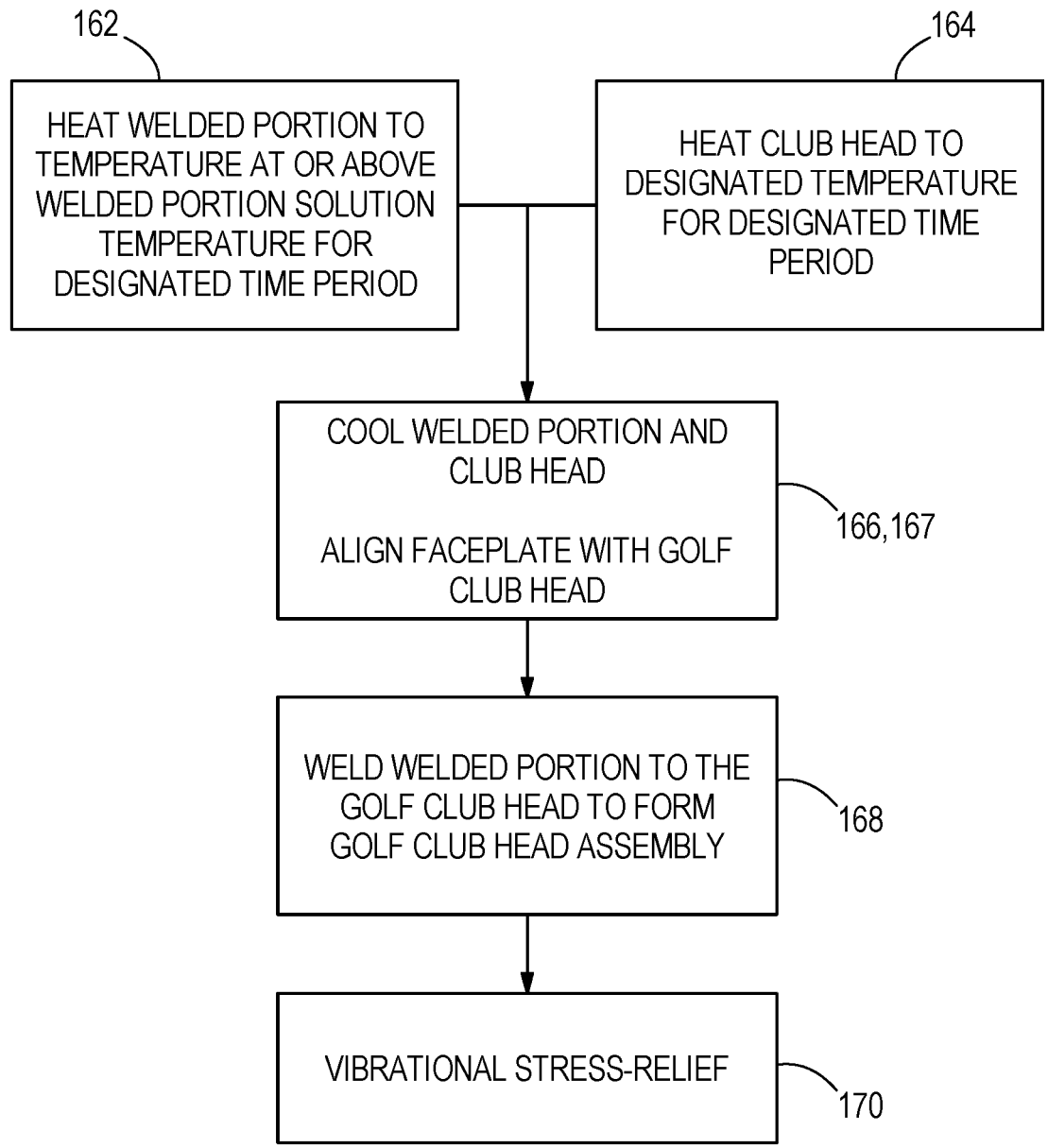
FIG. 15 is a schematic view of a process for forming an iron type golf club having a welded portion.

FIG. 15 shows the process for forming the golf club head assembly 300. The process for forming the club head assembly 300 can comprise (1,2) heat curing treatments of the welded portion and the golf club head 100 separately before welding into the club head assembly 300, (3) a cooling step of the welded portion and the golf club head, (4,5) an aligning and welding step of the welded portion and the golf club head 100 after heating to form a golf club head assembly 300, and (6) a vibrational curing treatment step of the welded golf club head assembly.

In the first step 162, the welded portion is heated using a first heat treatment for a predetermined amount of time. In the second step 164, the golf club head 100 is heated using a second heat treatment for a predetermined amount of time. The first heat treatment of the welded portion can comprise heating the welded portion to a temperature at or above the solution temperature of the welded portion. The second heat treatment of the golf club head 100 is heated to a predetermined temperature over a predetermined amount of time.

The third step 166 of the process is allowing the club head 100 and welded portion to air cool. The third step 166 can occur in an inert gas environment. The fourth step of the process 167 is aligning the welded portion treated under the first heat treatment with the club head body 100 treated under the second heat treatment. The fifth step 168 of the process is welding the welded portion to the golf club head 100 to form the golf club head assembly 300. The final step 170 is relieving the stress of the weld of golf club head assembly 300 by vibrational waves.

This process allows the welded portion and body to be treated separately allowing the design of the club to utilize the ideal physical properties of both the welded portion and the body of club head 100 (e.g., ductility, strength, and durability parameters of the materials). In other embodiments, the first step 162 can comprise heating the golf club head 100 above the solution temperature of the golf club head 100, and the second step 164 can comprise heating the welded portion to a predetermined temperature for a predetermined amount of time. The process of FIG. 15 is discussed in more detail below.

A. Heat Treatment of Welded Portion and Iron Type Club Head

In one embodiment, the method of forming a golf club head assembly 300 comprises heating both the welded portion and the golf club head 100 to relieve stresses through a thermal heat treatment (162, 164) (see FIG. 15). The heat treatments of the welded portion and the golf club head 100 can be different from each other and separate. The heat treatment of the welded portion can be a first heat treatment tailored to relieve stress in a furnace through thermal heat of microstructure stress. The second heat treatment of the golf club head can be a second heat treatment tailored relieve stress in a furnace through thermal heat of microstructure stress. The first heat treatment and the second heat treatment can be performed in any order to each other including simultaneously, but separately. In some embodiments, the heat treatment of the welded portion can be used to promote the high strength of the material of the welded portion (i.e., the second material). The heat treatment of the golf club head 100 can be used to maintain the ductility of the club head body (i.e. the first material). In other embodiments, the heat treatment of the welded portion can be used to maintain the ductility of the material of the welded portion (i.e., the second material). The heat treatment of the golf club head 100 can be used to promote the high strength of the club head body (i.e. the first material). The heat treatment of the golf club head 100 can differ over the heat treatment of the welded portion.

1) First Heat Treatment of the Welded Portion

In one embodiment, the welded portion can be heated under a first heat treatment. In one embodiment of the first heat treatment, the welded portion can be heated to a temperature at, just above, or greater than the solution temperature of the welded portion (i.e. second material) for a predetermined amount of time. In another embodiment of the first heat treatment, the welded portion can be heated to a temperature below the solution temperature of the welded portion for a predetermined amount of time. Also, during this step, an inert gas can be pumped into the heating chamber housing the welded portion to remove all oxygen over a predetermined amount of time discussed below. After heating to, just above, or greater than the second materials solution temperature, inert gas can be pumped back into a chamber under vacuum housing the welded portion, which ensures no oxygen is present to prevent oxidation to the welded portion. In some embodiments, the first heat treatment can further include a first aging heat treatment step, wherein the welded portion can be heated to a temperature at, just above, or greater than a predetermined first aging temperature. Further, in some embodiments, the first heat treatment can further include a second aging heat treatment step, wherein the welded portion can be heated to a temperature at, just above, or greater than a predetermined second aging temperature.

The solution temperature for a specific material is the temperature barrier at which smaller constituent molecules dissolve within the general matrix of the material and become more mobile. Further, the predetermined temperatures for the first and second aging heat treatments are temperatures at which the alloying elements such as, copper, cobalt, magnesium, and aluminum etc. are able to diffuse through the microstructure and form intermetallic particles. The predetermined aging temperatures for steel alloys can vary depending on the final properties desired. Table 2 shows possible solution temperatures for various materials.

TABLE 2

| Solution Temperatures for Steel Alloys | |
|---|---|
| Steel Alloy | Solution Temperature (° C.) |
| 17-4 | 1040 |
| 15-5 | 1040 |
| 4340 | 850 |
| 4140 | 845 |
| M54 | 1080 |
| 300M | 930 |
| H11 | 1000 |
| 1025 | 910 |
| S45C | 880 |
| 8620 | 915 |

In one embodiment, the welded portion is heat treated between 700° C. and 1100° C. in the first step 162. In one embodiment, the welded portion is heat treated between 750° C. and 1050° C. in the first step 162. In one embodiment, the welded portion is heat treated between 800° C. and 1000° C. in the first step 162. In one embodiment, the welded portion is heat treated between 850° C. and 950° C. in the first step 162. In one embodiment, the welded portion is heat treated at 700° C., 725° C., 750° C., 775° C., 800° C., 825° C., 850° C., 875° C., 900° C., 925° C., 950° C., 975° C., 1000° C., 1025° C., 1050° C., 1075° C., 1100° C. in the first step 162 for 30 minutes, 60 minutes, 90 minutes, 120 minutes, 150 minutes, 180 minutes, 210 minutes, 240 minutes, 270 minutes, 300 minutes, 330 minutes or 360 minutes.

In one embodiment, the welded portion is heat treated at a temperature of at least 700° C. in the first step 162. In one embodiment, the welded portion is heat treated at a temperature of at least 720° C. in the first step 162. In one embodiment, the welded portion is heat treated at a temperature of at least 740° C. in the first step 162. In one embodiment, the welded portion is heat treated at a temperature of at least 760° C. in the first step 162. In one embodiment, the welded portion is heat treated at a temperature of at least 775° C. in the first step 162. In one embodiment, the welded portion is heat treated at a temperature of at least 800° C. in the first step 162. In one embodiment, the welded portion is heat treated at a temperature of at least 825° C. in the first step 162. In one embodiment, the welded portion is heat treated at a temperature of at least 845° C. in the first step 162. In one embodiment, the welded portion is heat treated at a temperature of at least 860° C. in the first step 162. In one embodiment, the welded portion is heat treated at a temperature of at least 880° C. in the first step 162. In one embodiment, the welded portion is heat treated at a temperature of at least 900° C. in the first step 162. In one embodiment, the welded portion is heat treated at a temperature of at least 920° C. in the first step 162. In one embodiment, the welded portion is heat treated at a temperature of at least 940° C. in the first step 162. In one embodiment, the welded portion is heat treated at a temperature of at least 960° C. in the first step 162. In one embodiment, the welded portion is heat treated at a temperature of at least 980° C. in the first step 162. In one embodiment, the welded portion is heat treated at a temperature of at least 1000° C. in the first step 162. In one embodiment, the welded portion is heat treated at a temperature of at least 1020° C. in the first step 162. In one embodiment, the welded portion is heat treated at a temperature of at least 1040° C. in the first step 162. In one embodiment, the welded portion is heat treated at a temperature of at least 1060° C. in the first step 162. In one embodiment, the welded portion is heat treated at a temperature of at least 1080° C. in the first step 162. In one embodiment, the welded portion is heat treated at a temperature of at least 1100° C. in the first step 162.

In one embodiment, the welded portion is heat treated between 800° C. and 900° C. for between 1 hour and 2 hours in the first step 162. In another embodiment, the welded portion is heat treated between 850° C. and 950° C. for between 1 hour and 2 hours in the first step 162. In another embodiment the welded portion is heat treated between 950° C. and 1100° C. for between 1 hour and 2 hours in the first step 162. In another embodiment, the welded portion is heat treated at about 845° C. for between 1 hour and 2 hours. In another embodiment, the welded portion is heat treated at about 850° C. for between 1 hour and 2 hours. In another embodiment, the welded portion is heat treated at about 880° C. for between 1 hour and 2 hours. In another embodiment, the welded portion is heat treated at about 910° C. for between 1 hour and 2 hours. In another embodiment, the welded portion is heat treated at about 915° C. for between 1 hour and 2 hours. In another embodiment, the welded portion is heat treated at about 930° C. for between 1 hour and 2 hours. In another embodiment, the welded portion is heat treated at about 1040° C. for between 1 hour and 2 hours. In another embodiment, the welded portion is heat treated at about 1074° C. for between 1 hour and 2 hours. In other embodiments, the heat treatment process can be implemented at other temperatures for a different amount of time. In addition, the heat treatment can be applied to a variety of materials and a variety of weld-types.

In some embodiments, the first heat treatment of the first step 162 can further include a first aging heat treatment step. The welded portion can be heat treated between 100° C. and 700° C. in the first aging heat treatment step of the first step 162. In one embodiment, the welded portion is heat treated between 150° C. and 650° C. in the first aging heat treatment step of the first step 162. In one embodiment, the welded portion is heat treated between 200° C. and 600° C. in the first aging heat treatment step of the first step 162. In one embodiment, the welded portion is heat treated between 250° C. and 550° C. in the first aging heat treatment step of the first step 162. In one embodiment, the welded portion is heat treated between 300° C. and 400° C. in the first aging heat treatment step of the first step 162. In one embodiment, the welded portion is heat treated at 100° C., 125° C., 150° C., 175° C., 200° C., 225° C., 250° C., 275° C., 300° C., 325° C., 350° C., 375° C., 400° C., 425° C., 450° C., 475° C., 500° C., 525° C., 550° C., 575° C., 600° C., 725° C., 750° C., 775° C., 800° C. in the first aging heat treatment step of the first step 162 for, 60 minutes, 90 minutes, 120 minutes, 150 minutes, 180 minutes, 210 minutes, 240 minutes, 270 minutes, 300 minutes, 330 minutes or 360 minutes, 390 minutes, 420 minutes, 450 minute, 480 minute, or 510 minutes.

In some embodiments, the first heat treatment of the first step 162 can further include a second aging heat treatment step. The welded portion can be heat treated between 200° C. and 500° C. in the second aging heat treatment step of the first step 162. In one embodiment, the welded portion is heat treated between 250° C. and 450° C. in the second aging heat treatment step of the first step 162. In one embodiment, the welded portion is heat treated between 300° C. and 400° C. in the third heating step of the first step 162. In one embodiment, the welded portion is heat treated at 200° C., 225° C., 250° C., 275° C., 300° C., 325° C., 350° C., 375° C., 400° C., 425° C., 450° C., 475° C., 500° C. in the first aging heat treatment step of the first step 162 for, 60 minutes, 90 minutes, 120 minutes, 150 minutes, 180 minutes, 210 minutes, 240 minutes, 270 minutes, or 300 minutes.

The heat treatment above the solution temperature disperses stresses as well as equiaxes the microstructure throughout the welded portion. This step of the heat-treatment improves the durability of the welded portion by relieving the stresses. The first and second aging heat treatments disperse the inner metallic compounds such as, cobalt, copper, magnesium, and aluminum etc. throughout the microstructure of the welded portion (i.e. second material). These steps ensure the materials in the alloy do not revert to their original configuration after a time period, and create a stronger, more ductile welded portion.

The grains of the welded portion steel alloy can be aligned in a crown to sole orientation prior to heat treating. The crown to sole orientation of the alloy grains permits stretching in the same direction. In some embodiments, the grains of the welded portion 17-4, 15-5, 4340, 4140, M54, 300M, H11, 1025, S45C, 8620 steel alloy can be aligned in a crown to sole orientation prior to heat treating. The crown to sole orientation of the 17-4, 15-5, 4340, 4140, M54, 300M, H11, 1025, S45C, 8620 steel alloy grains permits stretching in the same direction.

The first heat treatment can improve the strength, ductility and durability of the welded portion. The improved strength permits the welded portion to be made thinner without sacrificing durability, thereby reducing club head assembly 300 weight. The reduced weight of welded portion can shift the center of gravity of the club head assembly 300, and allows for additional weight to be added to another component of the club further adjusting the center of gravity and moment of inertia 2) Second Heat Treatment of the Iron Type Club Head In one embodiment, the golf club head body 100 can be heated under a second heat treatment. In one embodiment of the second heat treatment, the club head body 100 can be exposed to no heat. In one embodiment of the second heat treatment, the club head body 100 can be heated to a temperature at, just above, or greater than the solution temperature of the club head body 100 for a predetermined amount of time. In another embodiment of the second heat treatment, the club head body 100 can be heated to a temperature below the solution temperature of the club head body 100 for a predetermined amount of time. Also, during this step, an inert gas can be pumped into the heating chamber housing the club head body 100 to remove all oxygen over a predetermined amount of time discussed below. After heating, inert gas can be pumped back into a chamber under vacuum housing the golf club head body 100, which ensures no oxygen is present to prevent oxidation to the surface of the golf club head body 100. In some embodiments, the second heat treatment can further include a first aging heat treatment step, wherein the club head body 100 can be heated to a temperature at, just above, or greater than a predetermined first aging temperature. Further, in some embodiments, the second heat treatment can further include a second aging heat treatment step, wherein the club head body 100 can be heated to a temperature at, just above, or greater than a predetermined second aging temperature.

In one embodiment, the club head body 100 is heat treated between 700° C. and 1100° C. in the second step 164. In one embodiment, the club head body 100 is heat treated between 750° C. and 1050° C. in the second step 164. In one embodiment, the club head body 100 is heat treated between 800° C. and 1000° C. in the second step 164. In one embodiment, the club head body 100 is heat treated between 850° C. and 950° C. in the second step 164. In one embodiment, the club head body 100 is heat treated at 700° C., 725° C., 750° C., 775° C., 800° C., 825° C., 850° C., 875° C., 900° C., 925° C., 950° C., 975° C., 1000° C., 1025° C., 1050° C., 1075° C., 1100° C. in the second step 164 for 30 minutes, 60 minutes, 90 minutes, 120 minutes, 150 minutes, 180 minutes, 210 minutes, 240 minutes, 270 minutes, 300 minutes, 330 minutes or 360 minutes.

In one embodiment, the club head body 100 is heat treated at a temperature of at least 700° C. in the second step 164. In one embodiment, the club head body 100 is heat treated at a temperature of at least 720° C. in the second step 164. In one embodiment, the club head body 100 is heat treated at a temperature of at least 740° C. in the second step 164. In one embodiment, the club head body 100 is heat treated at a temperature of at least 760° C. in the second step 164. In one embodiment, the club head body 100 is heat treated at a temperature of at least 780° C. in the second step 164. In one embodiment, the club head body 100 is heat treated at a temperature of at least 800° C. in the second step 164. In one embodiment, the club head body 100 is heat treated at a temperature of at least 820° C. in the second step 164. In one embodiment, the club head body 100 is heat treated at a temperature of at least 840° C. in the second step 164.

In one embodiment, the club head body 100 is heat treated at a temperature of at least 860° C. in the second step 164. In one embodiment, the club head body 100 is heat treated at a temperature of at least 880° C. in the second step 164. In one embodiment, the club head body 100 is heat treated at a temperature of at least 900° C. in the second step 164. In one embodiment, the club head body 100 is heat treated at a temperature of at least 920° C. in the second step 164. In one embodiment, the club head body 100 is heat treated at a temperature of at least 940° C. in the second step 164. In one embodiment, the club head body 100 is heat treated at a temperature of at least 960° C. in the second step 164. In one embodiment, the club head body 100 is heat treated at a temperature of at least 980° C. in the second step 164. In one embodiment, the club head body 100 is heat treated at a temperature of at least 1000° C. in the second step 164. In one embodiment, the club head body 100 is heat treated at a temperature of at least 1020° C. in the second step 164. In one embodiment, the club head body 100 is heat treated at a temperature of at least 1040° C. in the second step 164. In one embodiment, the club head body 100 is heat treated at a temperature of at least 1060° C. in the second step 164. In one embodiment, the club head body 100 is heat treated at a temperature of at least 1080° C. in the second step 164. In one embodiment, the club head body 100 is heat treated at a temperature of at least 1100° C. in the second step 164.

In one embodiment, the club head body 100 is heat treated between 475° C. and 500° C. for between 4 hours and 6 hours in the second step 64. In another embodiment, the club head body 10 is heat treated between 575° C. and 625° C. for between 1 hour and 2 hours in the second step 64. In another embodiment, the club head body 10 is heat treated at about 550° C. for between 1 hour and 4 hours. In other embodiments, the club head body 10 can be formed from a different alloy in the second step 64. In other embodiments, the heat treatment process can be implemented at other temperatures for a different amount of time. In addition, the heat treatment can be applied to a variety of materials and a variety of weld-types.

In one embodiment, the club head body 100 is heat treated between 800° C. and 900° C. for between 1 hour and 2 hours in the second step 164. In another embodiment the club head body 100 is heat treated between 850° C. and 950° C. for between 1 hour and 2 hours in the second step 164. In another embodiment the club head body 100 is heat treated between 950° C. and 1050° C. for between 1 hour and 2 hours in the second step 164. In another embodiment, the club head body 100 is heat treated at about 845° C. for between 1 hour and 2 hours in the second step 164. In another embodiment, the club head body 100 is heat treated at about 850° C. for between 1 hour and 2 hours in the second step 164. In another embodiment, the club head body 100 is heat treated at about 880° C. for between 1 hour and 2 hours in the second step 164. In another embodiment, the club head body 100 is heat treated at about 910° C. for between 1 hour and 2 hours in the second step 164. In another embodiment, the club head body 100 is heat treated at about 915° C. for between 1 hour and 2 hours in the second step 164. In another embodiment, the club head body 100 is heat treated at about 930° C. for between 1 hour and 2 hours in the second step 164. In another embodiment, the club head body 100 is heat treated at about 1040° C. for between 1 hour and 2 hours in the second step 164. In another embodiment, the club head body 100 is heat treated at about 1074° C. for between 1 hour and 2 hours in the second step 164. In other embodiments, the heat treatment process can be implemented at other temperatures for a different amount of time. In addition, the heat treatment can be applied to a variety of materials and a variety of weld-types.

In some embodiments, the second heat treatment of the second step 164 can further include a first aging heat treatment step. The club head 100 can be heat treated between 100° C. and 700° C. in the first aging heat treatment step of the second step 164. In one embodiment, the club head 100 is heat treated between 150° C. and 650° C. in the first aging heat treatment step of the second step 164. In one embodiment, the club head 100 is heat treated between 200° C. and 600° C. in the first aging heat treatment step of the second step 164. In one embodiment, the club head 100 is heat treated between 250° C. and 550° C. in the first aging heat treatment step of the second step 164. In one embodiment, the club head 100 is heat treated between 300° C. and 400° C. in the first aging heat treatment step of the second step 164. In one embodiment, the club head 100 is heat treated at 100° C., 125° C., 150° C., 175° C., 200° C., 225° C., 250° C., 275° C., 300° C., 325° C., 350° C., 375° C., 400° C., 425° C., 450° C., 475° C., 500° C., 525° C., 550° C., 575° C., 600° C., 725° C., 750° C., 775° C., 800° C. in the first aging heat treatment step of the second step 164 for, 60 minutes, 90 minutes, 120 minutes, 150 minutes, 180 minutes, 210 minutes, 240 minutes, 270 minutes, 300 minutes, 330 minutes or 360 minutes, 390 minutes, 420 minutes, 450 minute, 480 minute, or 510 minutes.

In some embodiments, the second heat treatment of the second step 164 can further include a second aging heat treatment step. The club head 100 can be heat treated between 200° C. and 500° C. in the second aging heat treatment step of the second step 164. In one embodiment, the club head 100 is heat treated between 250° C. and 450° C. in the second aging heat treatment step of the second step 164. In one embodiment, the club head 100 is heat treated between 300° C. and 400° C. in the second aging heat treatment step of the second step 164. In one embodiment, the club head 100 is heat treated at 200° C., 225° C., 250° C., 275° C., 300° C., 325° C., 350° C., 375° C., 400° C., 425° C., 450° C., 475° C., 500° C. in the second aging heat treatment step of the second step 164 for, 60 minutes, 90 minutes, 120 minutes, 150 minutes, 180 minutes, 210 minutes, 240 minutes, 270 minutes, or 300 minutes.

The heat treatment above the solution temperature disperses stresses as well as equiaxes the microstructure throughout the welded portion. This step of the heat-treatment improves the durability of the welded portion by relieving the stresses. The first and second aging heat treatments disperse the inner metallic compounds such as, cobalt, copper, magnesium, and aluminum etc. throughout the microstructure of the welded portion (i.e. second material). These steps ensure the materials in the alloy do not revert to their original configuration after a time period, and create a stronger, more ductile welded portion.

The first heat treatment can improve the strength, ductility and durability of the club head body 100. The improved strength permits the club head body 100 to be made thinner without sacrificing durability, thereby reducing club head weight. The reduced weight of club head body 100 shifts the center of gravity of the club head assembly 300, and allows additional weight to be added to another component of the club to further adjust the center of gravity and moment of inertia.

B. Cooling the Iron Type Golf Club Body and Welded Portion After Heat Treatment

In one embodiment of the process, after the steps of heating the club head 100 and the welded portion separately, the club head 100 and the welded portion are allowed to cool to room temperature (166) (see FIG. 15). In another embodiment, after the heat treatment, the club head assembly 300 can be allowed to air cool to slowly reduce the club head assembly's temperature. The cooling of the club head 100 and the welded portion can be done in an inert gas environment or non-contained environment (open air). In one embodiment, the first and second heat treatment steps can be followed by a cooling step where additional inert gas can be pumped back into the chamber where the club head 100 or the welded portion are allowed to cool to room temperature. In another embodiment, the club head assembly 300 can be allowed to cool in inert gas to slowly reduce the club head assembly's temperature and reduce chance for oxidation. The inert gas can be selected from the group consisting of nitrogen (N), argon (Ar), helium (He), neon (Ne), krypton (Kr), and xenon (Xe) or a compound gas thereof.

C. Welding Faceplate to the Wood or Hybrid Type Golf Club Head Body

In one embodiment of the process, the cooled club head 100 and the welded portion are aligned (167) and welded (168) to form the golf club head assembly 300 (see FIG. 15). As shown in FIG. 7, the club head 100 can include a recess or opening 124 for receiving the welded portion. The opening may include a lip 126 extending around the perimeter of the opening 124. During the welding process, the welded portion is aligned (167) with the opening and the lip 126. The welded portion is secured to the club head 100 by welding (168) to form a club head assembly 300. In one embodiment, the welding can be arc welding, oxyfuel gas welding, resistance welding, solid state welding, laser beam welding, laser hybrid welding, thermite welding, percussion welding, pulse plasma welding, electron beam welding, electrogas welding, stud arc welding, or induction welding. The welding can be a pulse plasma welding process.

The welding between the welded portion and the golf club head 100 can introduce stresses associated with the weld-metal heat affected zone (HAZ) formed by the weld line. The HAZ is an area around the weld in which the material properties have been altered due to the welding process. Because of the stark contrast in mechanical properties between the HAZ and the rest of the metal matrix, the HAZ is much more likely to experience a crack and fail.

As discussed in corresponding US Patent Publication Appl. No. 2015-0232976, which is incorporated fully herein by reference, a heat curing step could be performed on the golf club head assembly 300 after the welding step. As further discussed in US Patent Publication Appl. No. 2015-0232976, previous post-weld treatments were performed below the solution temperature for a short duration of time. These processes simply aged the metals, but did not address the increased stresses transferred to the weld area. Furthermore, the welded portion was not sufficiently strong. In contrast, the heat treatment above the solution temperature disperses stresses in the weld metal HAZ. The heat-treatment improves the durability of the HAZ by relieving the stresses. The problem with heating the golf club assembly 300, however, is subsequent heat treat steps on the HAZ require compromised thermal cycles to balance out the mechanical properties of both the golf club body 100 and the welded portion.

Specifically, utilization of this heat curing step of the golf club assembly 300 requires a trade-off between the materials of the welded portion and the materials of the club head 100. In some embodiments, the goal of heat curing the welded portion is to make the material as strong as the material will allow, while avoiding introducing an unacceptable level of brittleness. In other embodiments, the goal is to relieve stresses introduce during forging, but also maintain its' ductility and overall structural movement. In some embodiments, the goal of heat curing the club head body 100 is to make the material as strong as the material will allow, while avoiding introducing an unacceptable level of brittleness. In other embodiments, the goal is to relieve stresses introduce during forging, but also maintain its' ductility and overall structural movement. To achieve these goals, a different level of heat curing (temperate and time) a welded portion is required over a heat curing treatment of a golf club head body because the material of the welded portion and the golf club head body are different.

The preassembled heating steps described above in the process allow the design of the club to utilize idea mechanical properties described above for the welded portion and the club head body 100. To relieve the stresses introduced by the welding metal HAZ, use of vibrational waves or sub-harmonic waves can be used to target the HAZ of the golf club assembly 300 in this process.

D. Vibrational Stress Relief

The method of forming a golf club assembly 300 further comprises the step of relieving the stress generated during the welding step using vibrational waves (170) (FIG. 15). The use of vibrational waves is a stress-relief technique disperses stresses in the weld metal HAZ. The use of vibrational waves can also be used to relieve stresses introduced in the welded portion and the club head body 100 during casting. The use of vibrational waves as a stress relieving method of metals is described in U.S. Pat. No. 4,968,359 and use of various vibrational treatments is described in US Patent Publication Appl. No. 2012/0198376, both of which are fully incorporated herein by reference. The method step comprises exposing the golf club assembly 300 to these vibrational stress relief techniques described below.

The vibrational stress-relief technique applies mechanical cyclic vibration energy to the golf club assembly 300 over a test frequency range and then monitoring damping effects of energy flowing into the golf club assembly 300 as a function of frequency to identify a plurality of orders of harmonic vibration absorption peaks, each consisting of a plurality of vibration absorption resonant peaks. This identification of harmonic vibrational absorption peaks can apply to various stress zones in the golf club assembly 300 (i.e., the welded portion and club head body 100) including the HAZ of the golf club assembly 300 after the weld step. A typical metal part can display up to forty-eight resonant peaks grouped into eight orders of harmonics, each consisting of approximately six resonant peaks. Harmonic vibration absorption peaks are distinguished from resonant vibration absorption peaks by appropriately damping the response characteristics of a vibration transducer coupled to the golf club assembly 300 such that the electrical output thereof varies as a function of harmonic groups of resonant peaks rather than the resonant peaks themselves.

The vibrational stress-relieve technique further can comprise identifying a specific harmonic peak among the three lowest orders of harmonics as a function of composition of the golf club assembly 300 to be stress relieved. This can include stress zones within the welded portion and club head body 100 of the golf club assembly 300 that were not properly cured during the heating step of the method, or the HAZ zone of the golf club assembly 300 after the weld step.

For example, the first order of harmonics, centered at approximately twenty-five hertz, is particularly advantageous for stress relief of low-carbon steels and cast iron. The second order of harmonics centered at about forty hertz has been found to be particularly advantageous for high-carbon steels, whereas the third order of harmonics centered at about fifty hertz has been found to particularly advantageous in conjunction with aluminum, titanium or copper alloys. Depending upon the make-up of the welded portion and the golf club body 100, the particular harmonics at a particular hertz (Hz) can be identified to relieve the stress of that part of the golf club assembly 300. The harmonics can therefore be centered at about 24 Hz, 25 Hz, 26 Hz, 27 Hz, 28 Hz, 29 Hz, 30 Hz, 31 Hz, 32 Hz, 33 Hz, 34 Hz, 35 Hz, 36 Hz, 37 Hz, 38 Hz, 39 Hz, 40 Hz, 41 Hz, 42 Hz, 43 Hz, 44 Hz, 45 Hz, 46 Hz, 47 Hz, 48 Hz, 49 Hz, 50 Hz, 51 Hz, 52 Hz, 53 Hz, 54 Hz or 55 Hz in conjunction with the welded portion and/or the golf club head body 100. The harmonics can therefore be centered at about 24 Hz, 25 Hz, 26 Hz, 27 Hz, 28 Hz, 29 Hz, 30 Hz, 31 Hz, 32 Hz, 33 Hz, 34 Hz, 35 Hz, 36 Hz, 37 Hz, 38 Hz, 39 Hz, 40 Hz, 41 Hz, 42 Hz, 43 Hz, 44 Hz, 45 Hz, 46 Hz, 47 Hz, 48 Hz, 49 Hz, 50 Hz, 51 Hz, 52 Hz, 53 Hz, 54 Hz or 55 Hz in conjunction with particular regions of the golf club head assembly 300 (i.e., the toe end, heel end, sole, crown, front, back etc.). The harmonics can therefore be centered at about 24 Hz, 25 Hz, 26 Hz, 27 Hz, 28 Hz, 29 Hz, 30 Hz, 31 Hz, 32 Hz, 33 Hz, 34 Hz, 35 Hz, 36 Hz, 37 Hz, 38 Hz, 39 Hz, 40 Hz, 41 Hz, 42 Hz, 43 Hz, 44 Hz, 45 Hz, 46 Hz, 47 Hz, 48 Hz, 49 Hz, 50 Hz, 51 Hz, 52 Hz, 53 Hz, 54 Hz or 55 Hz in conjunction with weld HAZ of the golf club head assembly 300.

A specific sub-harmonic stress relief frequency is then identified along the leading slope or shoulder of the selected harmonic peak, preferably at a frequency corresponding to harmonic vibration amplitude equal to one third of the peak amplitude of the selected harmonic peak. Mechanical cyclic vibration energy is then applied to the part for extended time duration at the sub-harmonic stress relief frequency so identified.

It has been found that stress relief can be implemented on a wide variety of metal alloys, both soft and hard alloys, and at processing stages at which the alloys are either hot or cold. Further, stress relief can be implemented either during the welding step described above or after welding of the golf club heads assembly 300. Cyclic vibration energy applied at the sub-harmonic stress relief frequency allows dynamic kinetic energy to flow into the metal of the particular region of the golf club assembly 300 including the HAZ when the frequency of cyclic vibration is applied with a low steady stable constant level. Cyclic vibration is a dynamic loading and unloading mechanism that uses the mass-spring relationship found in metal alloys. Compliance of the yield modulus (stiffness) represents the amount of critical (tensile) residual stress retained in the metal structure. When cold mechanical cyclic energy is applied at the sub-harmonic frequency, it redistributes or transforms the unwanted residual stress from weakness to strength. A time soak of low harmonic energy (typically under two hours) provides metal relaxation similar to that gained from two to three years of outdoor aging.

In addition, the heat treatment along with the vibrational stress relief technique can be applied to a variety of materials and a variety of weld-types. Depending upon the region of the golf club head assembly, the welded portion can be treated with as described above over the solution temperature of the metal or metal composite of the welded portion, and then further exposed to the vibrational stress relief technique. The vibrational stress relief technique can further be used in place of the first and second heat treatment steps describe above.

The post-weld vibrational stress relief disperses stresses associated with the weld-metal heat affected zone (HAZ) of the golf club assembly 300, or the area around the weld in which the material properties have been altered due to the welding process. Because of the stark contrast in mechanical properties between the HAZ and the rest of the metal matrix, the HAZ is much more likely to experience a crack and fail. Using the vibrational stress-relief technique in this method prevents the faceplate from flattening or losing its' curvature relatively quickly. The vibrational stress-relieve technique disperses stresses in the weld metal HAZ. The identification of the specific sub-harmonic stress relief frequency along the leading slope or shoulder of the selected harmonic peak of the particular treatment region of golf club head assembly 300 improves the durability of the HAZ by relieving the stresses.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims.

As the rules to golf can change from time to time (e.g., new regulations can be adopted or old rules can be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein can be conforming or non-conforming to the rules of golf at any particular time. Accordingly, golf equipment related to the apparatus, methods, and articles of manufacture described herein can be advertised, offered for sale, and/or sold as conforming or non-conforming golf equipment. The apparatus, methods, and articles of manufacture described herein are not limited in this regard.

While the above examples can be described in connection with a driver-type golf club, the apparatus, methods, and articles of manufacture described herein can be applicable to other types of golf club such as a fairway wood-type golf club, a hybrid-type golf club, an iron-type golf club, a wedge-type golf club, or a putter-type golf club. Alternatively, the apparatus, methods, and articles of manufacture described herein can be applicable other type of sports equipment such as a hockey stick, a tennis racket, a fishing pole, a ski pole, etc.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Various features and advantages of the disclosure are set forth in the following claims.

The invention claimed is:
1. A method of forming a golf club head assembly, the method comprising:
  (a) providing a faceplate formed from a first material,
  (b) providing a golf club head body formed from a second material, wherein the first material is different than the second material,
  (c) heating the golf club head body under a heat treatment, wherein the golf club head body is heated to a tem- perature that is greater than a solvus temperature of the golf club head body for a predetermined amount of time;

(d) after heating the golf club head body from step (c), allowing the golf club head body to cool in an inert gas environment;

(e) aligning the faceplate of step (a) with the golf club head body of step (b) after heating step (c) and cooling step (d);

(f) welding the faceplate to the golf club head body to form a heat affected zone (HAZ) between the faceplate and the golf club head body to form a golf club head assembly; and (g) relieving stress of the HAZ of the golf club head assembly by vibrational waves.

2. The method of claim 1, wherein step (g) further comprises the steps of:

(i) applying a mechanical cyclic vibration energy to the golf club assembly over a test frequency range;

(ii) monitoring damping effects of energy flowing into the golf club head assembly as a function of frequency and identifying a plurality of orders of harmonic vibration absorption peaks, each consisting of a plurality of vibration absorption resonant peaks;

(iii) selecting a particular harmonic vibration absorption peak among said plurality of harmonic vibration absorption peaks as a function of the golf club head assembly; and (iv) applying mechanical cycle vibration energy to the golf club head assembly for an extended period of time at said particular harmonic vibration absorption peak corresponding to a sub-harmonic frequency.

3. The method of claim 2, wherein step (g) further comprises the steps of:

(1) selecting a particular order of harmonics from among said plurality of orders as a function of the golf club head assembly; and (2) identifying a sub-harmonic frequency associated with said particular order of harmonics and corresponding to a vibration amplitude equal to approximately one-third of maximum vibrational amplitude of said particular order, and wherein applying the mechanical cyclic vibration energy to the golf club head assembly of step (iv) of claim 2 comprises a step of applying said mechanical cyclic vibration energy to the golf club head assembly at said sub-harmonic frequency identified in step (2).

4. The method of claim 1, wherein welding the faceplate to the golf club head body includes a pulse plasma welding process.

5. The method of claim 1, wherein the heat treatment of step (c) includes heating the golf club head body for between 30 minutes and 360 minutes.

6. The method of claim 1, wherein the heat treatment of step (c) includes heating the golf club head body to between 400° C. and 630° C.

7. The method of claim 1, wherein the heat treatment of step (c) includes heating the golf club head body to between 575° C. and 625° C. for between 1 hour and 4 hours.

8. The method of claim 1, wherein the inert gas environment of step (d) is selected from the group consisting of nitrogen (N), argon (Ar), helium (He), neon (Ne), krypton (Kr), and xenon (Xe) or a compound gas thereof.

9. The method of claim 1, wherein the faceplate of step (a) has a minimum thickness of 0.7 mm.

10. The method of claim 1, wherein the faceplate is formed from an $\alpha$-$\beta$ titanium alloy.

11. The method of claim 10, wherein the $\alpha$-$\beta$ titanium alloy comprises between 6.5 wt % to 8.5 wt % aluminum (Al), 1.0 wt % to 2.0 wt % vanadium (V), 0.20 wt % or less oxygen (O), and 0.20 wt % or less silicon (Si).

12. The method of claim 11, wherein the $\alpha$-$\beta$ titanium alloy further comprises 0.30 wt % or less iron (Fe), 0.08 wt % or less carbon (C), 0.50 wt % or less nitrogen (N), trace molybdenum (Mo), trace tin (Sn), and a remaining weight percent is titanium (Ti).

13. A method of forming an iron-type golf club head assembly, the method comprising:

(a) providing a welded portion formed from a first material, wherein the welded portion comprises at least one member selected from the group consisting of: a faceplate, a front portion, a back portion, a lower back portion, a bottom portion, and a hosel portion;

(b) providing an iron-type club head body formed from a second material, wherein the first material is different than the second material, (c) heating the iron-type club head body under a heat treatment, wherein the iron-type club head body is heated to a temperature that is greater than a solvus temperature of the iron-type club head body for a predetermined amount of time;

(d) after heating the iron-type club head body from step (c), allowing the iron-type club head body to cool in an inert gas environment;

(e) aligning the welded portion of step (a) with the iron-type club head body of step (b) after heating step (c), and cooling step (d);

(f) welding the welded portion to the iron-type club head body after step (e) to form a heat affected zone (HAZ) between the welded portion and the iron-type club head body to form a golf club head assembly; and (g) relieving stress of the HAZ of the golf club head assembly by using vibrational waves.

14. The method of claim 13, wherein step (g) further comprises the steps of:

(i) applying a mechanical cyclic vibration energy to the golf club assembly over a test frequency range;

(ii) monitoring damping effects of energy flowing into the iron-type golf club head assembly as a function of frequency and identifying a plurality of orders of harmonic vibration absorption peaks, each consisting of a plurality of vibration absorption resonant peaks;

(iii) selecting a particular harmonic vibration absorption peak among said plurality of harmonic vibration absorption peaks as a function of the iron-type golf club head assembly; and (iv) applying mechanical cycle vibration energy to the iron-type golf club head assembly for an extended period of time at said particular harmonic vibration absorption peak corresponding to a sub-harmonic frequency.

15. The method of claim 14, wherein step (g) further comprises the steps of:

(1) selecting a particular order of harmonics from among said plurality of orders as a function of the iron-type golf club head assembly; and (2) identifying a sub-harmonic frequency associated with said particular order of harmonics and corresponding to a vibration amplitude equal to approximately one-third of maximum vibrational amplitude of said particular order, and wherein applying the mechanical cyclic vibration energy to the golf club head assembly of step (iv) of claim 2 comprises a step of applying said mechanical cyclic vibration energy to the iron-type golf club head assembly at said sub-harmonic frequency identified in step (2).

16. The method of claim 13, wherein the heat treatment of step (c) includes heating the iron-type club head body for between 30 minutes and 360 minutes.

17. The method of claim 13, wherein the heat treatment of step (c) includes heating the iron-type club head body to between 700° C. and 1100° C.

18. The method of claim 13, wherein the heat treatment of step (c) includes heating the iron-type club head body to between 800° C. and 900° C. for between 1 hour and 2 hours.

19. The method of claim 13, wherein the inert gas environment of step (d) is selected from the group consisting of nitrogen (N), argon (Ar), helium (He), neon (Ne), krypton (Kr), and xenon (Xe) or a compound gas thereof.

20. The method of claim 13, wherein the faceplate is formed from an α-β titanium alloy that comprises between 6.5 wt % to 8.5 wt % aluminum (Al), 1.0 wt/0 to 2.0 wt % vanadium (V), 0.20 wt % or less oxygen (O), and 0.20 wt % or less silicon (Si).

\* \* \* \* \*